United States Patent [19]

Uchida et al.

[11] Patent Number: 5,610,658
[45] Date of Patent: Mar. 11, 1997

[54] MOTION VECTOR DETECTION USING HIERARCHICAL CALCULATION

[75] Inventors: Masashi Uchida; Tetsujiro Kondo; Hideo Nakaya; Takashi Horishi; Toshihiro Ishizaka, all of Kanagawa, Japan

[73] Assignee: Sony Corporation, Tokyo, Japan

[21] Appl. No.: 380,557

[22] Filed: Jan. 30, 1995

[30] Foreign Application Priority Data

| | | | |
|---|---|---|---|
| Jan. 31, 1994 | [JP] | Japan | 6-027270 |
| Feb. 7, 1994 | [JP] | Japan | 6-034195 |
| Sep. 22, 1994 | [JP] | Japan | 6-254760 |

[51] Int. Cl.$^6$ .................................................. H04N 7/32
[52] U.S. Cl. ........................................... 348/416; 348/699
[58] Field of Search ............................. 348/699, 700, 348/416, 408, 402, 390, 384

[56] References Cited

U.S. PATENT DOCUMENTS

| | | | |
|---|---|---|---|
| 5,142,360 | 8/1992 | Niihara | 348/699 |
| 5,296,927 | 3/1994 | Guillotel | 348/699 |
| 5,351,095 | 9/1994 | Kerdranvat | 348/699 |
| 5,461,423 | 10/1995 | Tsukagoshi | 348/700 |
| 5,477,272 | 12/1995 | Zhang et al. | 348/699 |
| 5,489,949 | 2/1996 | Jeong et al. | 348/699 |

FOREIGN PATENT DOCUMENTS 54-124927  9/1979  Japan ........................... H04N 5/22

*Primary Examiner*—Tommy P. Chin
*Assistant Examiner*—Bryan S. Tung
*Attorney, Agent, or Firm*—William S. Frommer; Alvin Sinderbrand

[57] ABSTRACT

An amount-of-movement detection device which is capable of detecting the amount of movement with a high degree of accuracy when the amount of movement of an image is detected by hierarchical block matching method. An amount-of-movement detection device 1 forms image data $S2_n$ and $S3_n$ of plural hierarchies having different resolutions from each other, by input image $S1_n$ input at a first point in time, and forms multiplexed image data $S2_{n-1}$ and $S3_{n-1}$ of a higher hierarchy of low resolution, based on an input image $S1_{n-1}$ input at a second point in time, by selecting pixels overlapping with each other from the image data of the lower hierarchy having higher resolution and reducing them in size, in order to detect a motion vector by block matching at a predetermined block unit for each of the hierarchies corresponding to the hierarchized image data $S2_n$ and $S3_n$ and the multiplexed and hierarchized image data $S2_{n-1}$ and $S3_{n-1}$. Thus, the accuracy in the detection of an amount of movement can be greatly enhanced.

8 Claims, 17 Drawing Sheets

| | | | | | |
|---|---|---|---|---|---|
| Xn(1,1) | Xn(2,1) | Xn(3,1) | Xn(4,1) | | |
| Xn(1,2) | Xn(2,2) | Xn(3,2) | Xn(4,2) | | |
| Xn(1,3) | Xn(2,3) | Xn(3,3) | Xn(4,3) | | |
| Xn(1,4) | Xn(2,4) | Xn(3,4) | Xn(4,4) | | |
| | | | | | |
| | | | | | |

| | | |
|---|---|---|
| Yn(1,1) | Yn(2,1) | Yn(3,1) |
| Yn(1,2) | Yn(2,2) | Yn(3,2) |
| Yn(1,3) | Yn(2,3) | Yn(3,3) |

|   |   |   |   |   |   |
|---|---|---|---|---|---|
| X$_{n-1}$(1,1) | X$_{n-1}$(2,1) | X$_{n-1}$(3,1) | X$_{n-1}$(4,1) |   |   |
| X$_{n-1}$(1,2) | X$_{n-1}$(2,2) | X$_{n-1}$(3,2) | X$_{n-1}$(4,2) |   |   |
| X$_{n-1}$(1,3) | X$_{n-1}$(2,3) | X$_{n-1}$(3,3) | X$_{n-1}$(4,3) |   |   |
| X$_{n-1}$(1,4) | X$_{n-1}$(2,4) | X$_{n-1}$(3,4) | X$_{n-1}$(4,4) |   |   |
|   |   |   |   |   |   |
|   |   |   |   |   |   |

|   |   |   |
|---|---|---|
| Y$_{n-1}$(1,1) | Y$_{n-1}$(2,1) | Y$_{n-1}$(3,1) |
| Y$_{n-1}$(1,2) | Y$_{n-1}$(2,2) | Y$_{n-1}$(3,2) |
| Y$_{n-1}$(1,3) | Y$_{n-1}$(2,3) | Y$_{n-1}$(3,3) |

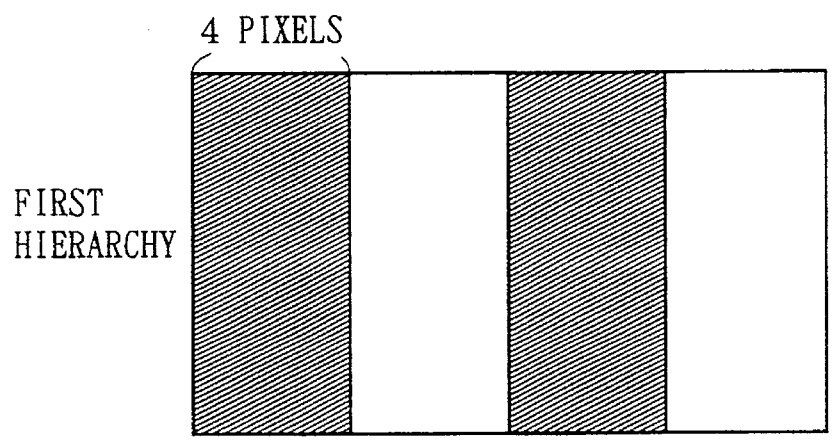
FIG. 5A  FIRST HIERARCHY
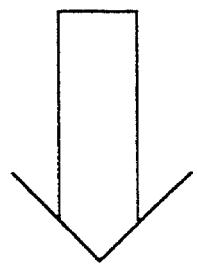
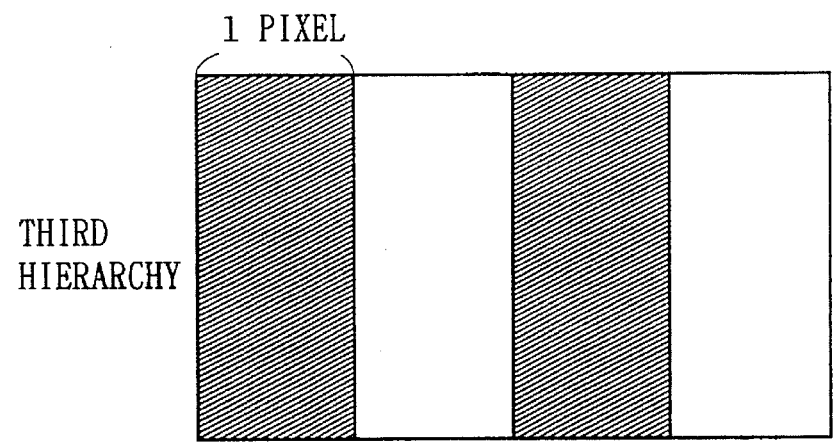
FIG. 5B  THIRD HIERARCHY

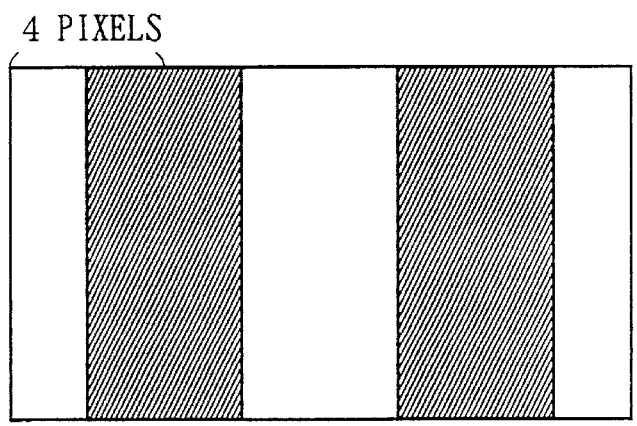
FIG. 6A  FIRST HIERARCHY
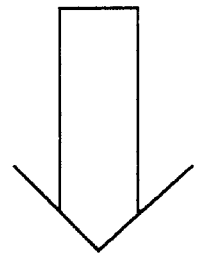
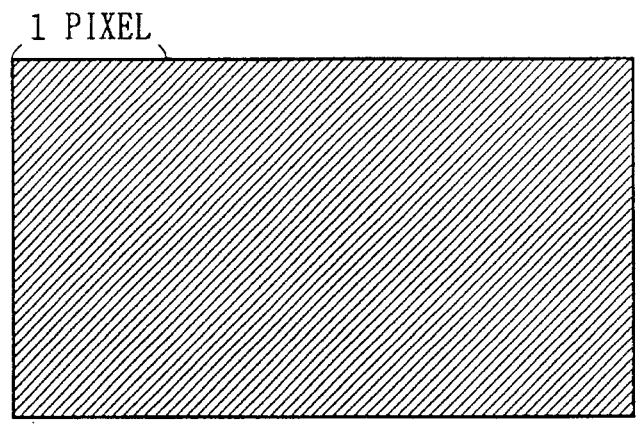
FIG. 6B  THIRD HIERARCHY

MOTION VECTOR DETECTION USING HIERARCHICAL CALCULATION

BACKGROUND OF THE INVENTION

1. Field of The Invention

This invention relates to a device for detecting an amount of movement and a method of detecting an amount of movement, and more particularly, to a device and a method which respectively hierarchize two image data different in time when detecting the movement of an image and then detect the amount of movement.

2. Description of The Related Art

It is known in the processing of motion pictures to employ the direction of movement and the magnitude (or speed) of an object in the images different in the amount of movement (motion vector), i.e., time. The amount of movement is used, for example, in the motion compensation interframe coding in high-efficiency picture coding or in the movement-based parameter control of a television noise reduction device using an interframe time regional filter. As an amount-of-movement detection method of obtaining an amount of movement of this image, there has been employed a block matching method (Japanese Patent Publication No. 54-124927).

In this block matching method, an image is first divided into blocks comprising several suitable pixels. Between the image data blocked in this way and a search region in which the image data of a screen different in time is blocked to search for a region that the blocked image data have moved, the two image data are evaluated at a pixel unit with a predetermined evaluation function, and the amount of movement between the two sets of blocked image data is detected by obtaining an optimum value giving the minimum evaluation value. Thereby, the amount of movement of an image can be detected with a high degree of accuracy.

However, it is necessary, in the block matching method to completely search all of the search regions, which becomes a range of detection, over all of the pixels of a block of an object of detection and to obtain the difference. For this reason, there is the problem that the amount of calculation for detecting an amount of movement becomes large, the device itself is increased in size, and the time of operation becomes longer.

SUMMARY OF THE INVENTION

In view of the foregoing, an object of this invention is to provide an amount-of-movement detection device and an amount-of-movement detection method which are capable of enhancing the accuracy in the detection of an amount of movement, when the amount of movement is detected with the hierarchized image data by a block matching method.

The foregoing object and other objects of the invention have been achieved by the provision of a motion vector detection device for detecting a motion vector between a base image and a reference image, comprising: a means for outputting a base-lower hierarchical image data having a resolution higher than that of the base image; a means for outputting a base higher hierarchical image data having a resolution lower than that of the base lower hierarchical image data of the base image; a means for outputting a reference lower hierarchical image data having a resolution higher than that of the reference image; a means for outputting multiplexed reference data multiplexing reference higher hierarchical image data having a resolution lower than that of the reference lower hierarchical image data with other reference higher hierarchical image data; a first motion vector detecting means for detecting a motion vector between the base image and the reference image, according to the base higher hierarchical image data and the multiplexed reference data; and a second motion vector detecting means for detecting a motion vector between the base image and the reference image based on the motion vector obtained by the first motion vector detecting means, according to the base lower hierarchical image data and the reference lower hierarchical image data.

In this invention, the motion vector detection device further comprising: a means for generating base lower hierarchical activity data representing the activity of the base lower hierarchical image data, and base higher hierarchical activity data representing the activity of the base higher hierarchical image data; and a means for generating reference lower hierarchical activity data representing the activity of the reference lower hierarchical image data, and multiplexed reference activity data representing the activity of the multiplexed reference data: wherein the first motion vector detecting means detects a motion vector between the base image and the reference image, according to the base higher hierarchical activity data and the multiplexed reference activity data, and the second motion vector detecting means further detects a motion vector between the base image and the reference image, according to the base lower hierarchical activity data and the reference lower hierarchical activity data.

Further, in this invention, the motion vector detection device wherein: the means for outputting multiplexed reference data selects the data corresponding to the intermediate position of the data adjusting to the reference higher hierarchical image data each other in oblique direction, of the image data of the reference image whose hierarchy is lower than the reference higher hierarchical image data, to multiplex the same with the reference higher hierarchical image data.

Furthermore, in this invention, the motion vector detection device wherein: the means for outputting multiplexed reference data selects the data corresponding to the intermediate position of the data adjusting each other in lateral direction and oblique direction of the reference higher hierarchical image data, to multiplex the same with the reference higher hierarchical image data.

According to this invention, the image data of plural hierarchies having different resolutions is formed from an input image input at a first point in time, and also the multiplexed image data of a higher hierarchy of low resolution is formed by selecting, based on an input image input at a second point in time, pixels overlapping with each other from the image data of the lower hierarchy of high resolution and reducing them in size and furthermore a motion vector is detected at a predetermined block unit for each hierarchy by block matching with respect to the hierarchized image data and the multiplexed, hierarchized image data. Therefore, an amount-of-movement detection device such that, even if the phase of the block used in the block matching according to the input image changes, the erroneous operation in the higher hierarchy can be avoided and the accuracy in the detection of the amount of movement by hierarchical block matching can be enhanced, can be realized.

Also, according to this invention, in addition to this, the activity data of plural hierarchies representative of the high-frequency component of the image data is formed for the input image input at a first point in time and the input image input at a second point in time, and the motion vector is detected by making reference to the evaluation value obtained with the activity data by block matching. Therefore, accuracy in the detection of the amount of movement can be further enhanced.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 2A and 2B are schematic diagrams explaining how second hierarchical image data of the nth frame is generated;

FIGS. 4A and 4B are schematic diagrams explaining how the second hierarchy image data of the (n-1)th frame is generated;

FIGS. 5A and 5B are schematic diagrams explaining the case in which an edge and a block coincide with each other after hierarchization;

FIGS. 6A and 6B are schematic diagrams explaining the case in which an edge and a block that do not coincide with each other after hierarchization;

FIGS. 12A, 12B, 13A, and 13B are schematic diagrams explaining a hierarchical image of a fifth embodiment of this invention;

DETAILED DESCRIPTION OF THE EMBODIMENT

Preferred embodiments of this invention will be described with reference to the accompanying drawings:

(1) First Embodiment

Figure 1:
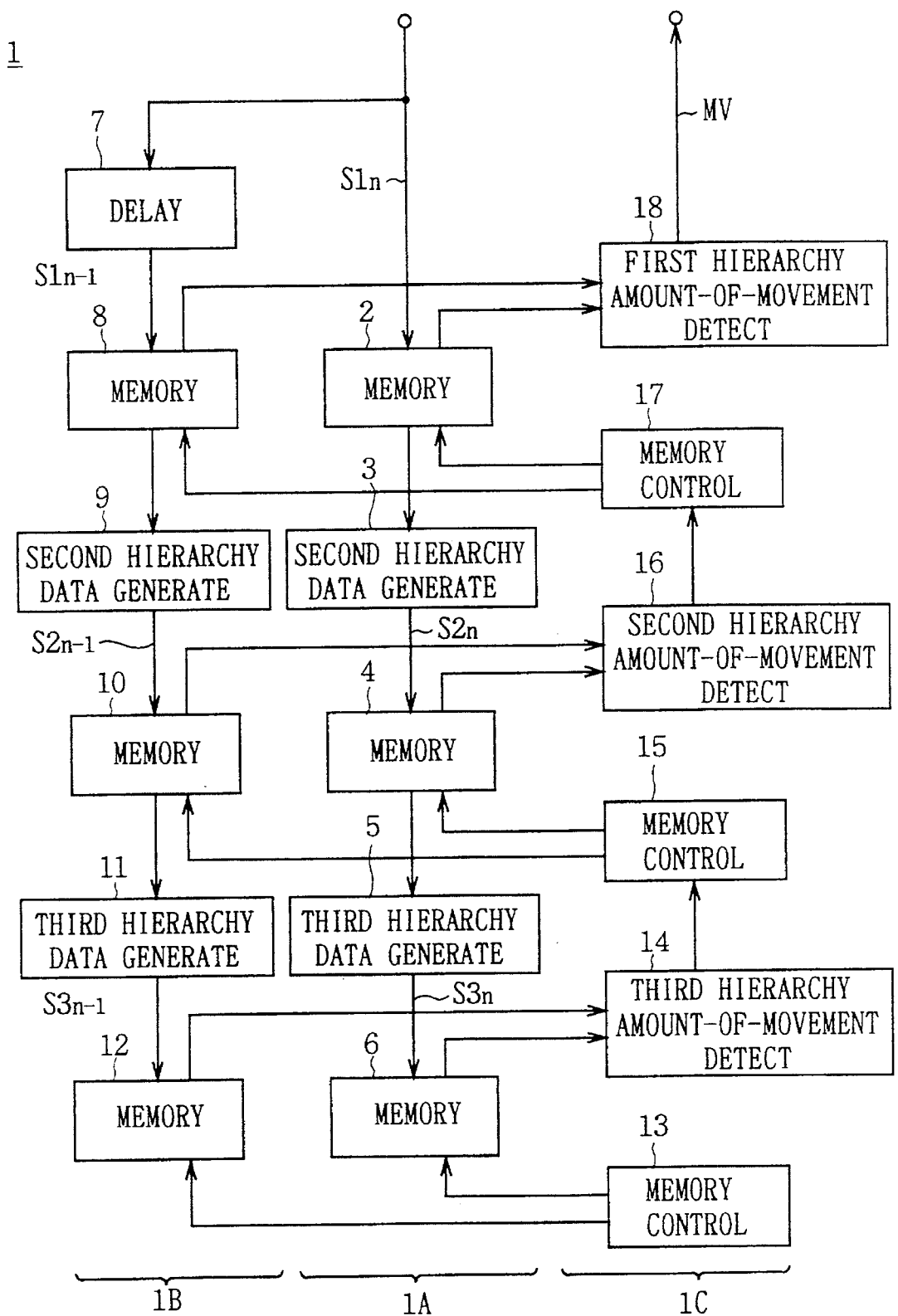
FIG. 1 is a block diagram showing an embodiment of an amount-of-movement detection device of this invention.

In FIG. 1, reference numeral 1 denotes an amount-of-movement detection device, which generate a plurality of hierarchical data having different resolution for image data of a current frame by a hierarchy processing section 1A and a plurality of hierarchical data having different resolution for image data of one frame previous to the current frame by a hierarchy processing section 1B.

The amount-of-movement detection device 1 uses hierarchical data generated at different times by hierarchy processing sections 1A and 1B to obtain an amount of movement for each hierarchy by a block matching method by an amount-of-movement detection section 1C. At this time, the amount-of-movement detection section 1C obtains a final motion vector MV of a first hierarchy with a smaller amount of operation by obtaining an amount of movement in order from a higher hierarchy and also obtaining an amount of movement in a lower hierarchy, based on the amount of movement obtained in the higher hierarchy.

In addition to this, in the amount-of-movement detection device 1, accuracy in the detection of motion vector can be enhanced by generating multiplexed data as higher hierarchical data, as will be described later, and by obtaining an amount of movement in a higher hierarchy by using this multiplexed higher hierarchical data.

In fact, the amount-of-movement detection device 1 receives a luminance signal of a component signal from an input terminal as first hierarchical image data (base data) $S1_n$ and supplies it to a memory 2 of the hierarchy processing section 1A.

The output signal of the memory 2 is supplied to a second hierarchical data generation circuit 3, which generates second hierarchical image data $S2_n$ from the first hierarchical image data $S1_n$. One pixel of the second hierarchical image data $S2_n$, for example, is generated by averaging the image data of a small region of 2 pixels×2 lines in the first hierarchical image data $S1_n$.

More particularly, as shown in FIG. 2A, when each pixel of the first hierarchical image data $S1_n$ in the nth frame is Xn(a, b), the second hierarchical data generation circuit 3 calculates each pixel Yn(a, b) of second hierarchical image data $S2_n$ as shown in FIG. 2B by the following equation:

$$Y_{n(1,1)} = X_{n(1,1)} + X_{n(2,1)} + X_{n(1,2)} + X_{n(2,2)}$$

$$Y_{n(2,1)} = X_{n(3,1)} + X_{n(4,1)} + X_{n(3,2)} + X_{n(4,2)}$$

$$Y_{n(1,2)} = X_{n(1,3)} + X_{n(2,3)} + X_{n(1,4)} + X_{n(2,4)}$$

$$Y_{n(2,2)} = X_{n(3,3)} + X_{n(4,3)} + X_{n(3,4)} + X_{n(4,4)} \quad (1)$$

The second hierarchical data generation circuit 3 generates the second hierarchical image data $S2_n$ over all of the supplied nth-frame data. The output signal of the second hierarchical data generation circuit 3 is supplied to a memory 4. The output signal of the memory 4 is supplied to a third hierarchical data generation circuit 5, which generates third hierarchical image data $S3_n$ from the second hierarchical image data $S2_n$. One pixel of the third hierarchical image data $S3_n$, for example, is generated by averaging the image data of a small region of 2 pixels×2 lines of the second hierarchical image data $S2_n$.

Figure 3A:
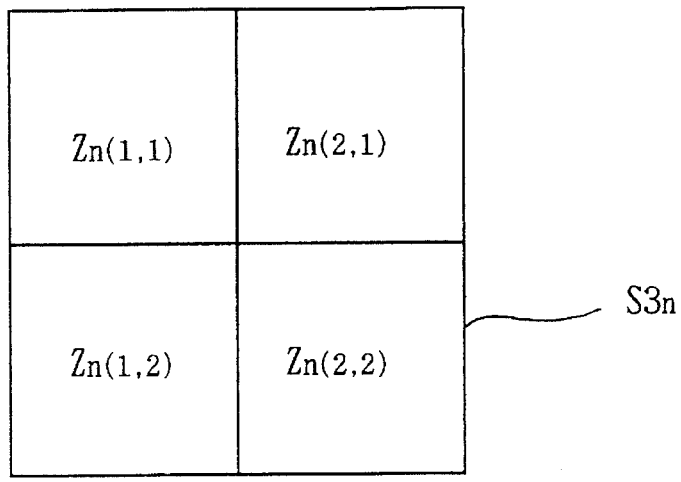
FIGS. 3A and 3B are schematic diagrams explaining third hierarchical image data of the nth frame and (n-1)th frame.

More particularly, the third hierarchical data generation circuit 5 calculates each pixel $Z_{n(a,b)}$ of the third hierarchical image data $S3_n$, such as that shown in FIG. 3A, from each pixel $Y_{n(a,b)}$ of the second hierarchical image data $S2_n$ in the nth frame, such as that shown in FIG. 2B, by the following equation:

$$Z_{n(1,1)} = Y_{n(1,1)} + Y_{n(2,1)} + Y_{n(1,2)} + Y_{n(2,2)}$$

$$Z_{n(2,1)} = Y_{n(3,1)} + Y_{n(4,1)} + Y_{n(3,2)} + Y_{n(4,2)}$$

$$Z_{n(1,2)}=Y_{n(1,3)}+Y_{n(2,3)}+Y_{n(1,4)}+Y_{n(2,4)}$$

$$Z_{n(2,2)}=Y_{n(3,3)}+Y_{n(4,3)}+Y_{n(3,4)}+Y_{n(4,4)} \quad (2)$$

The third hierarchical data generation circuit 5 generates the third hierarchical image data $S3_n$ over all of the supplied nth-frame data. The output signal of the third hierarchical data generation circuit 5 is supplied to a memory 6.

On the other hand, the first hierarchical image data $S1_n$ comprising input image data is also supplied to a delay circuit 7 of the hierarchy processing section 1B. The delay circuit 7 stores the first hierarchical image data $S1_n$ of one frame. Therefore, the delay circuit 7 sends to a memory 8 first hierarchical image data $S1_{n-1}$ of one frame previous to current frame data.

The first hierarchical image data $S1_{n-1}$ of one frame previous that is output from the memory 8, is supplied to a second hierarchical data generation circuit 9. The second hierarchical data generation circuit 9 is identical in construction to the above-described second hierarchical data generation circuit 3 and generates second hierarchical image data $S2_{n-1}$ of one frame previous from the supplied first hierarchical image data $S1_{n-1}$ of one frame previous. For example, as shown in FIGS. 4A and 4B, when each pixel of the first hierarchical image data $S1_{n-1}$ in the (n-1)th frame is $X_{n-1(a, b)}$, the second hierarchy data generation circuit 9 calculates each pixel $Y_{n-1(a, b)}$ of the second hierarchical image data $S2_{n-1}$ by the following equation:

$$Y_{n-1(1,1)}=X_{n-1(1,1)}+X_{n-1(2,1)}+X_{n-1(1,2)}+X_{n-1(2,2)}$$

$$Y_{n-1(2,1)}=X_{n-1(3,1)}+X_{n-1(4,1)}+X_{n-1(3,2)}+X_{n-1(4,2)}$$

$$Y_{n-1(1,2)}=X_{n-1(1,3)}+X_{n-1(2,3)}+X_{n-1(1,4)}+X_{n-1(2,4)}$$

$$Y_{n-1(2,2)}=X_{n-1(3,3)}+X_{n-1(4,3)}+X_{n-1(3,4)}+X_{n-1(4,4)} \quad (3)$$

The second hierarchical data generation circuit 9 generates the second hierarchical image data $S2_{n-1}$ over the whole of the supplied image data of one frame previous. The output signal of the second hierarchical data generation circuit 9 is supplied to a memory 10. The output signal of the memory 10 is supplied to a third hierarchical data generation circuit 11, which generates third hierarchical image data $S3_{n-1}$ of a frame previous to the second hierarchical image data $S2_{n-1}$ of a previous frame.

Figure 3B:
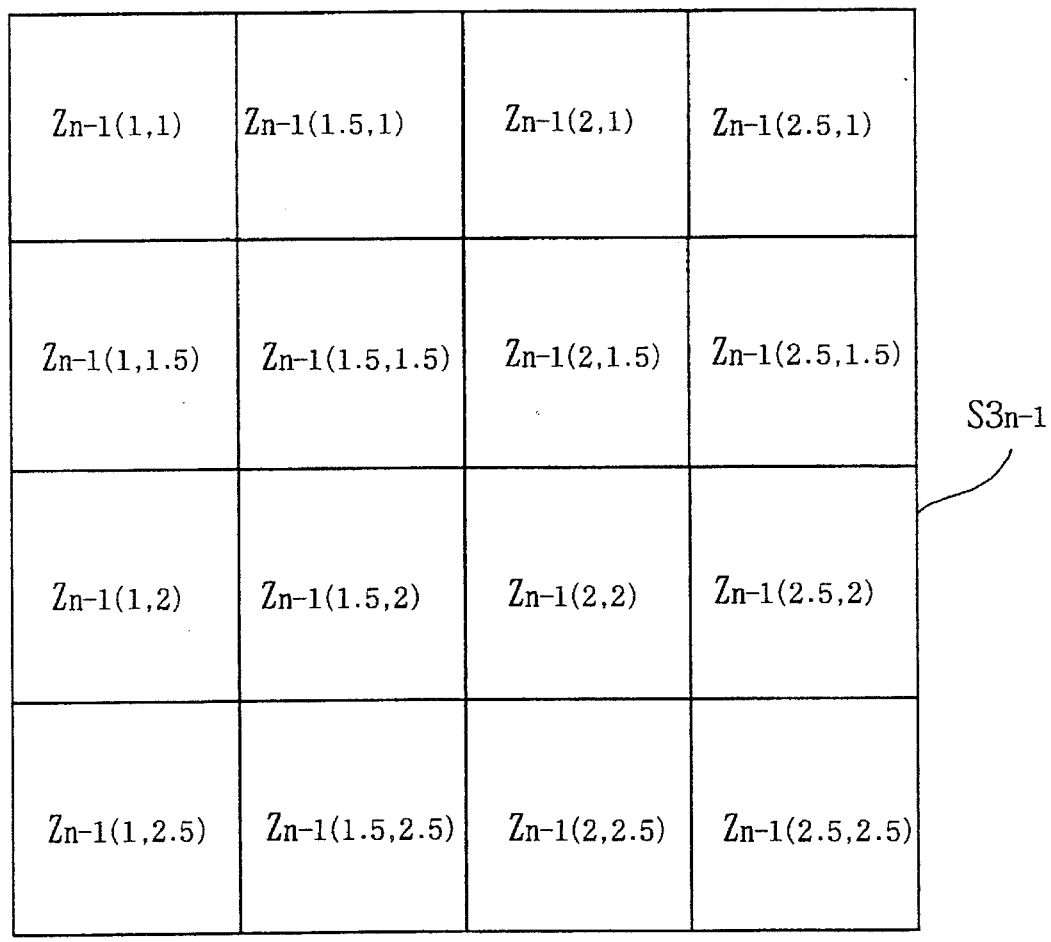

That is, when each pixel of the second hierarchical image data $S2_{n-1}$ in the (n-1)th frame, such as that shown in FIG. 4B, is $Y_{n-1(a, b)}$, the third hierarchical data generation circuit 11 calculates each pixel $Z_{n-1(a, b)}$ of the third hierarchical image data of the (n-1)th frame, such as that shown in FIG. 3B, by the following equation:

$$Y_{n-1(1,1)}=X_{n-1(1,1)}+X_{n-1(2,1)}+X_{n-1(1,2)}+X_{n-1(2,2)}$$

$$Y_{n-1(2,1)}=X_{n-1(3,1)}+X_{n-1(4,1)}+X_{n-1(3,2)}+X_{n-1(4,2)}$$

$$Y_{n-1(1,2)}=X_{n-1(1,3)}+X_{n-1(2,3)}+X_{n-1(1,4)}+X_{n-1(2,4)}$$

$$Y_{n-1(2,2)}=X_{n-1(3,3)}+X_{n-1(4,3)}+X_{n-1(3,4)}+X_{n-1(4,4)} \quad (4)$$

In addition to this, the third hierarchical data generation circuit 11 also generates third hierarchical image data different in phase from the third hierarchical image data $Z_{n-1(a, b)}$ obtained by Equation (4). That is, the third hierarchical data generation circuit 11 calculates pixels adjacent in the vertical and horizontal directions to each pixel of normal third hierarchical image data, shown in FIG. 3B, such as pixels $Z_{n-1(1.5, 1)}$, $Z_{n-1(1, 1.5)}$, and $Z_{n-1(1.5, 1.5)}$, by the following equation:

$$Z_{n-1(1.5,1)}=Y_{n-1(2,1)}+Y_{n-1(3,1)}+Y_{n-1(2,2)}+Y_{n-1(3,2)}$$

$$Z_{n-1(1,1.5)}=Y_{n-1(1,2)}+Y_{n-1(2,2)}+Y_{n-1(1,3)}+Y_{n-1(2,3)}$$

$$Z_{n-1(1.5,1.5)}=Y_{n-1(2,2)}+Y_{n-1(3,2)}+Y_{n-1(2,3)}+Y_{n-1(3,3)} \quad (5)$$

That is, the third hierarchical data generation circuit 11 also generates third hierarchical image data ($Z_{n-1(1, 1.5)}$, $Z_{n-1(1.5, 1)}$, $Z_{n-1(1.5, 1.5)}$, etc.), different in phase from normal third hierarchical image data, by selecting the pixel of second hierarchical image data $S2_{n-1}$ overlapping with the pixel of second generating normal third hierarchical image data ($Z_{n-1(1, 1)}$, $Z_{n-1(1, 2)}$, $Z_{n-1(2, 1)}$, $Z_{n-1(2, 2)}$, etc.).

The third hierarchical data generation circuit 11 therefore generates normal third hierarchical image data and normal third hierarchical data different in phase over all of the supplied frame data of the previous frame. Multiplexed third hierarchical image data $S3_{n-1}$ is generated in this way. The output signal of the third hierarchical data generation circuit 11 is supplied to a memory 12.

In this embodiment, the amount-of-movement detection section 1C, by fixing a block of the current frame (hereinafter referred to as a reference block) and moving a block of the previous frame (hereinafter referred to as a candidate block) within a predetermined search range, is made to detect a motion vector, based on the position at which the candidate block most similar to the reference block was detected.

In fact, the amount-of-movement section 1C first reads the third hierarchical image data $S3_n$ of the current frame stored in the memory 6, and the multiplexed third hierarchical image data $S3_{n-1}$ of the previous frame stored in the memory 12, using a memory control circuit 13. When this occurs, a block address whose vector is now calculated is sent from the memory control circuit 13 to the memory 6 and, consequently, a predetermined block of the third hierarchical image data $S3_n$ is output as a reference block from the memory 6 to a third hierarchy amount-of-movement detection circuit 14.

On the other hand, a block address whose position has been moved within the predetermined search range with respect to the block address to the memory 6 is sent from the memory control circuit 13 to the memory 12 and, consequently, the third hierarchical data $S3_{n-1}$ corresponding to the supplied block address is output from the memory 12 to the third hierarchy amount-of-movement detection circuit 14.

The third hierarchy amount-of-movement detection circuit 14 obtains a motion vector in the third hierarchy by a block matching method. The third hierarchy amount-of-movement detection circuit 14 first adds the difference in absolute value between the pixels of blocks corresponding to the nth and (n-1)th frames, and detects the amount of movement in the third hierarchy by using the added value as a parameter and finding a parameter whose added value becomes minimum.

In other words, for a block of a size of M pixels×N lines which is set at a position spatially corresponding to the nth frame and the (n-1)th frame, the third hierarchy amount-of-movement detection circuit 14 performs pattern matching between the block in the nth frame and the block offset in the (n-1)th frame from the position spatially corresponding to the block of the nth frame by the predetermined search range, and then detects the most similar block.

At this time, a sum of differences in absolute value between corresponding pixels within a block is used as an evaluation value. Concretely, when each pixel level of the third hierarchy of the nth frame is $Z_{n(i, j)}$, each pixel level of the third hierarchy of (n−1)th frame is $Z_{n-1(i, j)}$, and the block size in the third hierarchy is P pixels×Q lines, the evaluation value E(X, Y) in coordinates (X, Y) is calculated by the following equation:

$$E(X, Y) = \sum_{i=0}^{P-1} \sum_{j=0}^{Q-1} |Z_{n(i,j)} - Z_{n-1(i+X, j+Y)}| \quad (6)$$

On the one hand, in the block matching method using a conventional hierarchical structure, when the search range of base data is (±16, ±16), the search range in the third hierarchy becomes (±4, ±4), and, by changing the offset coordinates (X, Y) one by one from −4 up to +4, the evaluation value is calculated to determine the amount of movement.

On the other hand, in the amount-of-movement detection device 1 of this embodiment, in the third hierarchical image, the amount-of-movement detection of one-pixel accuracy by conventional block matching is not performed but the amount of movement is detected with 0.5-pixel accuracy. That is, in the amount-of-movement detection device 1, the offset coordinates (X, Y) are changed 0.5 by 0.5 from −4 up to +4 and the evaluation value is calculated to determine the amount of movement.

Concretely, when the block size in the third hierarchy is 2×2 and the elements in the nth frame are $Z_{n(1, 1)}$, $Z_{n(2, 1)}$, $Z_{n(1, 2)}$, and $Z_{n(2, 2)}$, the evaluation value in the offset coordinates (X, Y) is calculated by the following equation:

$E_{(0,0)} = |Z_{n(1,1)} - Z_{n-1(1,1)}| + |Z_{n(2,1)} - Z_{n-1(2,1)}| + |Z_{n(1,2)} - X_{n-1(1,2)}| + |Z_{n(2,2)} - Z_{n-1(2,2)}|$ $E_{(0.5,0)} = |Z_{n(1,1)} - Z_{n-1(1.5,1)}| + |Z_{n(2,1)} - Z_{n-1(2.5,1)}| + |Z_{n(1,2)} - Z_{n-1(1.5,2)}| + |Z_{n(2,2)} - Z_{n-1(2.5,2)}|$ $E_{(0,0.5)} = |Z_{n(1,1)} - Z_{n-1(1,1.5)}| + |Z_{n(2,1)} - Z_{n-1(2,1.5)}| + |Z_{n(1,2)} - Z_{n-1(1,2.5)}| + |Z_{n(2,2)} - Z_{n-1(2,2.5)}|$ $E_{(0.5,0.5)} = |Z_{n(1,1)} - Z_{n-1(1.5,1.5)}| + |Z_{n(2,1)} - Z_{n-1(2.5,1.5)}| + |Z_{n(1,2)} - Z_{n-1(1.5,2.5)}| + |Z_{n(2,2)} - Z_{n-1(2.5,2.5)}|$ (7)

Note that, the data of $Z_{n-1(x, y)}$ use the data generated by the above-described third hierarchical data generation circuit 11.

Thereby, the error in the detection of the amount of movement caused by a reduction in the amount of information in a higher hierarchy can be reduced in the amount-of-movement detection device 1.

For example, as shown in FIGS. 5A and 5B, if white and black stripe images of a 4-pixel width were in the first hierarchical image (base image), when the edges of these stripe images correspond to the block boundaries of the hierarchy in a hierarchical block matching method, they become white and black stripe images of a 1-pixel width and sufficient data remains.

However, as shown in FIGS. 6A and 6B, when this first hierarchical image moves laterally by two pixels after one frame in a conventional hierarchical block matching method, the stripes are lost completely in the third hierarchy and become a monochromatic image of gray, because the block boundary of the hierarchy is shifted to the center of the stripe. In this case, the data of the first hierarchy is lost completely. Thus, on the one hand, in the detection of the amount of movement of a higher hierarchy by a conventional hierarchical block matching method, when the phase of the block changed according to the movement of an image, the detail is completely changed in an image shrunk after hierarchization and, in some cases, it becomes impossible to calculate accurate pattern matching, i.e., an accurate amount of movement.

On the other hand, the amount-of-movement detection device 1 of this embodiment, by overlapping and selecting image data of a lower hierarchy and generating multiplexed image data $S3_{n-1}$ of a higher hierarchy, can prevent a reduction in the amount of information in the higher hierarchy and enhance accuracy in the detection of the amount of movement even if the phase of the block changed according to the movement of an image.

Figure 7:
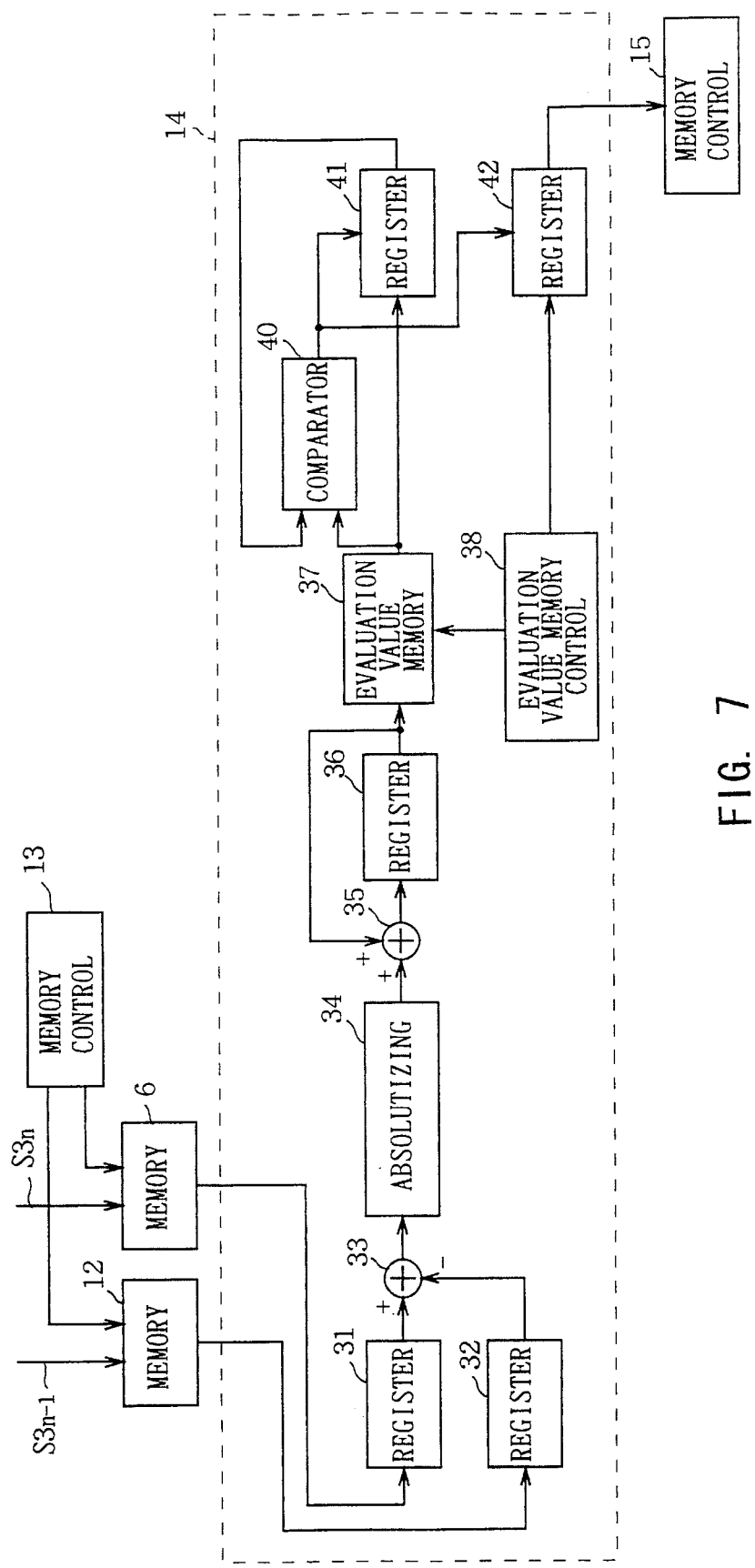
FIG. 7 is a block diagram showing the construction of an amount-of-movement detection circuit of this invention.

The third hierarchy amount-of-movement detection circuit 14 is constructed as shown in FIG. 7. The third hierarchical image data $S3_n$ read from the memory 6 in accordance with the block address from the memory control circuit 13 is input to the third hierarchy amount-of-movement detection circuit 14 as a reference block which becomes a standard for obtaining the amount of movement.

The third hierarchical image data $S3_{n-1}$ cut from positions moved 0.5 pixel by 0.5 pixel within a search range in accordance with the block address from the memory control circuit 13 is also input as a candidate block to the third hierarchy amount-of-movement detection circuit 14.

For example, when the search range in the third hierarchy is (±4, ±4), block data of ((4+3)×2+1)×((4+3)×2+1) is input from the memory 12. Hence, in a normal search of one pixel offset (one-pixel accuracy), block data of (4×2+1)×(4×2+1) is output for a search range of (±4, ±4) from the memory 12. The block data output from the memory 6 is supplied through a register 31 to an adder 33 and, also, block data output from the memory 12 is supplied through a register 32 to the adder 33.

In the adder 33, a difference between the pixels respectively corresponding to the block data of third hierarchical image data $S3_n$ and the block data of third hierarchical image data $S3_{n-1}$ corresponding to third hierarchical image data $S3_n$ is obtained. After the difference data for each pixel has been absolutized by an absolutizing circuit 34, the absolutized data is accumulated in an adder 35 and a register 36. The operation of Equation (7) is executed in this way, and the resultant evaluation value (accumulated value) is input to an evaluation value memory 37.

Therefore, in the evaluation value memory 37, there is formed an evaluation value table in which evaluation values respectively corresponding to the moving positions that a candidate block is moved at a unit of 0.5 pixel are stored. The evaluation values stored in the evaluation value memory 37 are read in sequence according to an address specified by an evaluation value memory control circuit 38 and is supplied to a comparator 40 and a register 41.

The comparator 40 compares the other input thereof with the evaluation value read by the evaluation value memory 37 and, when the input evaluation value is smaller, it outputs a signal for updating the contents of registers 41 and 42. Addresses for reading the evaluation value memory 37 are set in sequence to this register 42. The evaluation values stored in sequence in the evaluation value memory 37 in this way are evaluated, an address giving the minimum of the evaluation value is sent from the register 42, and this is supplied as a motion vector of the third hierarchy to a memory control circuit 15 of the second hierarchy.

The memory control circuit 15, as shown in FIG. 1, outputs a block address for reading the pixel data of an attention block whose amount of movement is now detected from the memory 4 in which second hierarchical image data $S2_n$ have been stored. As a result, the pixel data read from the memory 4 is supplied to a second hierarchy amount-of-movement detection circuit 16.

On the other hand, the memory control circuit 15 outputs a block address to the memory 10 in which the second hierarchical image data $S2_{n-1}$ has been stored. This block address is an address for reading, from the memory 10, the image data corresponding to the block of the second hierarchical image data $S2_n$ read from the memory 4, with an offset of one pixel unit within a predetermined search range. At this time, the search range is (±1) from a position offset by the amount that the amount of movement in the third hierarchy obtained in the third hierarchy amount-of-movement detection circuit 14 is converted to the scale of the second hierarchy.

The second hierarchy amount-of-movement detection circuit 16 is identical in construction with the third hierarchy amount-of-movement detection circuit 14 (FIG. 7) and calculates an accumulative addition value of the absolute value of a difference between corresponding blocks supplied from the memories 4 and 10. An offset amount whose accumulative addition value becomes minimum is assumed to be the amount of movement in the second hierarchy. The second hierarchy amount-of-movement detection circuit 16 adds this amount of movement in the second hierarchy and the amount of movement in the third hierarchy converted to the scale of the second hierarchy, and this is output as the amount of movement in the second hierarchy to a memory control circuit 17.

The memory control circuit 17 outputs a block address for reading the pixel data of an attention block whose amount of movement is now detected from the memory 2 in which the first hierarchical image data $S1_n$ have been stored. As a result, pixel data read from the memory 2 is supplied to a first hierarchy amount-of-movement detection circuit 18.

On the other hand, the memory control circuit 17 outputs a block address to the memory 8 in which the first hierarchical image data $S1_{n-1}$ have been stored. This block address is an address for reading, from the memory 8, the pixel data corresponding to the block of the first hierarchical image data $S1_n$ read from the memory 2, with an offset of one pixel unit within a predetermined search range. At this time, the search range is (±1) from a position offset by the amount that the amount of movement in the second hierarchy obtained in the second hierarchy amount-of-movement detection circuit 16 is converted to the scale of the first hierarchy.

The first hierarchy amount-of-movement detection circuit 18 is also identical in construction with the third hierarchy amount-of-movement detection circuit 14 (FIG. 7) and calculates an accumulative addition value of the absolute value of a difference between corresponding blocks supplied from the memories 2 and 8. An offset amount whose accumulative addition value becomes minimum is assumed to be the amount of movement in the first hierarchy. The first hierarchy amount-of-movement detection circuit 18 adds up this amount-of-movement in the first hierarchy and the amount of movement in the second hierarchy converted to the scale of the first hierarchy, and this is obtained as a final amount of movement in the first hierarchy.

The amount of movement in the first hierarchy calculated in this way is an amount of movement MV which is an object of detection, and the amount-of-movement detection device 1 outputs the amount of movement of an attention block thus calculated through its output terminal.

Figure 8:
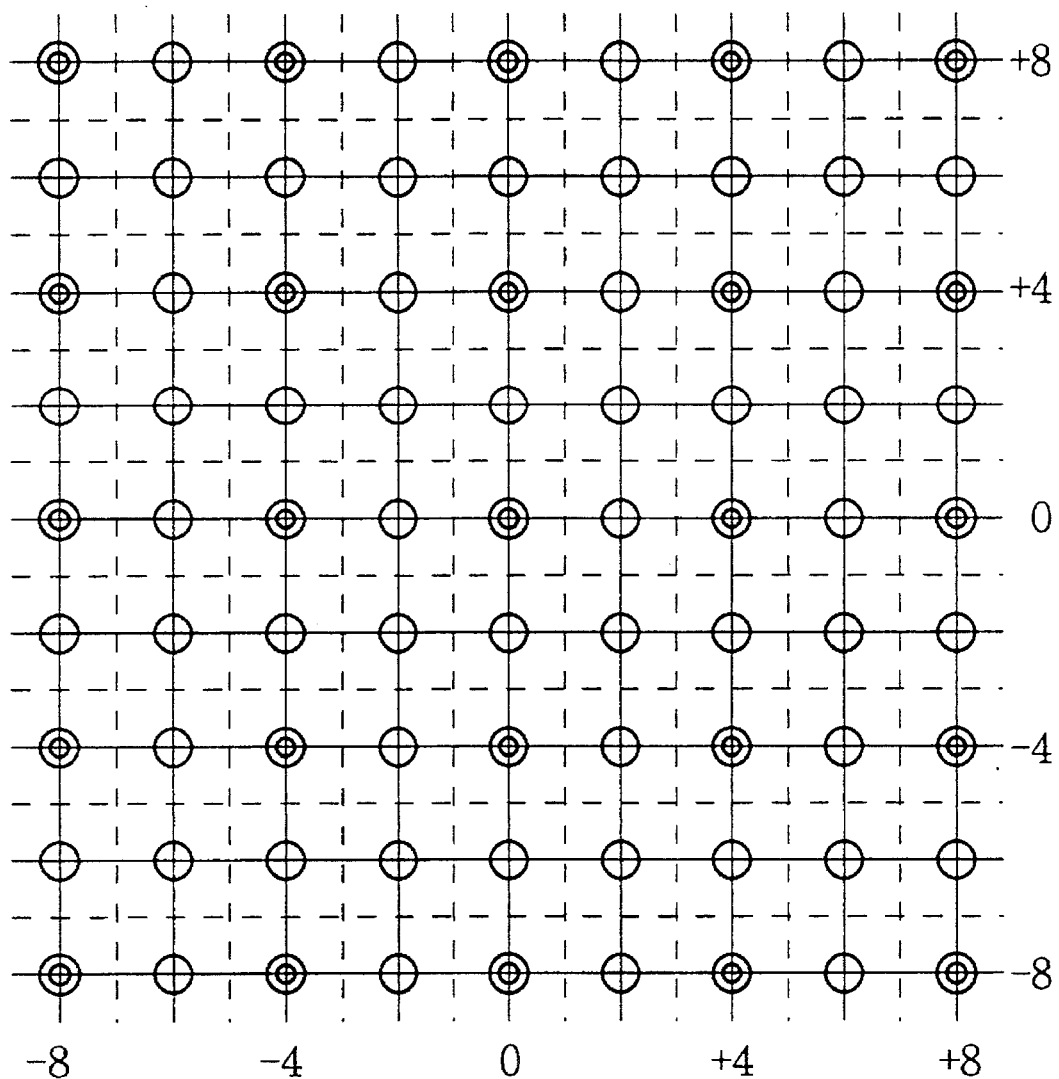
FIG. 8 is a schematic diagram explaining the third hierarchical image data of a first embodiment of this invention.

In the above-described construction, the amount-of-movement detection device 1, when obtaining the third hierarchical image data which is the highest hierarchy, generates a normal average value pixel such as that shown by "⊙" in FIG. 8 by averaging a plurality of pixels of the second hierarchical image data. In addition to this, the device 1 also generates an average value pixel shown by "₀" in FIG. 8 by selecting and averaging the pixel of the second hierarchical image data overlapping with the pixel of the second hierarchical image data used when generating the normal average value pixel shown by "⊙".

With the average value pixels shown by "⊙" and "₀", the amount-of-movement detection device 1 detects the amount of movement in the third hierarchy not with one-pixel accuracy of the prior art but with 0.5-pixel accuracy. As a result, a change in the phase between hierarchies that is caused by a hierarchical block matching method can be reduced and therefore an error in the detection of the amount of movement in the third hierarchy can be reduced. Therefore, the final accuracy in the detection of the amount of movement in the first hierarchy can be greatly enhanced.

Hence, if the third hierarchy is thus multiplexed and the amount of movement of 0.5-pixel accuracy is detected, the detection of the amount of movement of the third hierarchy requires about 4 times amount of movement of calculation as the detection of the amount of movement of one-pixel accuracy. However, since the block size of the third hierarchy is ¼ of that of the second hierarchy, the overall amount of calculation is not much increased even if the amount of calculation in the third hierarchy is increased.

According to the above-described construction, higher hierarchical image data multiplexed is generated by selecting pixels overlapping with each other from lower hierarchical image data and obtaining an average value thereof and, in that higher hierarchical data, the amount of movement is detected with accuracy finer than one-pixel accuracy. Thereby, an amount-of-movement detection device 1 which is capable of greatly enhancing accuracy in the detection of the amount of movement, can be realized.

(2) Second Embodiment

While in the above-described first embodiment the pixel marked "₀" adjacent in the vertical, horizontal, and oblique directions around the pixel marked "⊙" has been generated in addition to the normal pixel of the third hierarchy marked "⊙" of FIG. 8 by selecting pixels overlapping with each other from the pixels of the second hierarchical image data and obtaining an average value thereof, in this second embodiment the pixel marked "₀" adjacent in the oblique direction of the pixel marked "⊙" is generated in addition to the normal pixel of the third hierarchy marked "⊙" by selecting pixels overlapping with each other from the pixels of the second hierarchical image data and obtaining an average value thereof.

More particularly, in this second embodiment, pixel data generated in the first embodiment, such as $Z_{n-1(1,\ 1.5)}$ or $Z_{n-1(1.5,\ 1)}$, is not generated but only pixel data such as $Z_{n-1(1,\ 1)}$ or $Z_{n-1(1.5,\ 1.5)}$ is obtained by a value-averaging operation.

In the amount-of-movement detection device of the second embodiment, the same amount-of-movement detection as the above-described first embodiment is performed with third hierarchical image data $S3_{n-1}$ generated in this way. Therefore, in the amount-of-movement detection device of the second embodiment, an increase in the amount of calculation in the third hierarchy can be reduced about twice the amount of calculation of a normal hierarchical block matching method.

Incidentally, for example, when a horizontal movement of 2 pixels in the first hierarchical image data occurred as shown in FIGS. 6A and 6B, extreme image compression frequently occurs in the detection of the amount of movement in the third hierarchy and it becomes difficult in many cases to obtain an accurate amount of movement. However, when there is no vertical movement, an amount of movement in that vertical direction is accurately obtained in many cases because the image shrinkage does not occur in the vertical direction. Also, on the one hand, when a movement of 2 pixels occurred in the vertical direction, extreme image compression frequently occurs in that direction and it becomes difficult in many cases to obtain an accurate amount of movement, but when in such case there is no horizontal movement, the amount of movement in the horizontal direction is accurately obtained in many cases. Therefore, when the block phase greatly shifts either in the vertical direction or in the horizontal direction, there are many cases where a relatively accurate amount of movement is obtained.

On the other hand, when a movement of 2 pixels (±4 pixels) occurs in the vertical and horizontal directions, the possibility of obtaining an inaccurate amount of movement is increased because in many cases an extreme image compression occurs in the vertical and horizontal directions.

In view of this, the second embodiment performs only the detection of the amount of movement of the phase when the movement of 2 pixels (±4 pixels) occurs in the vertical and horizontal directions, in addition to a normal hierarchical block matching method.

Figure 9:
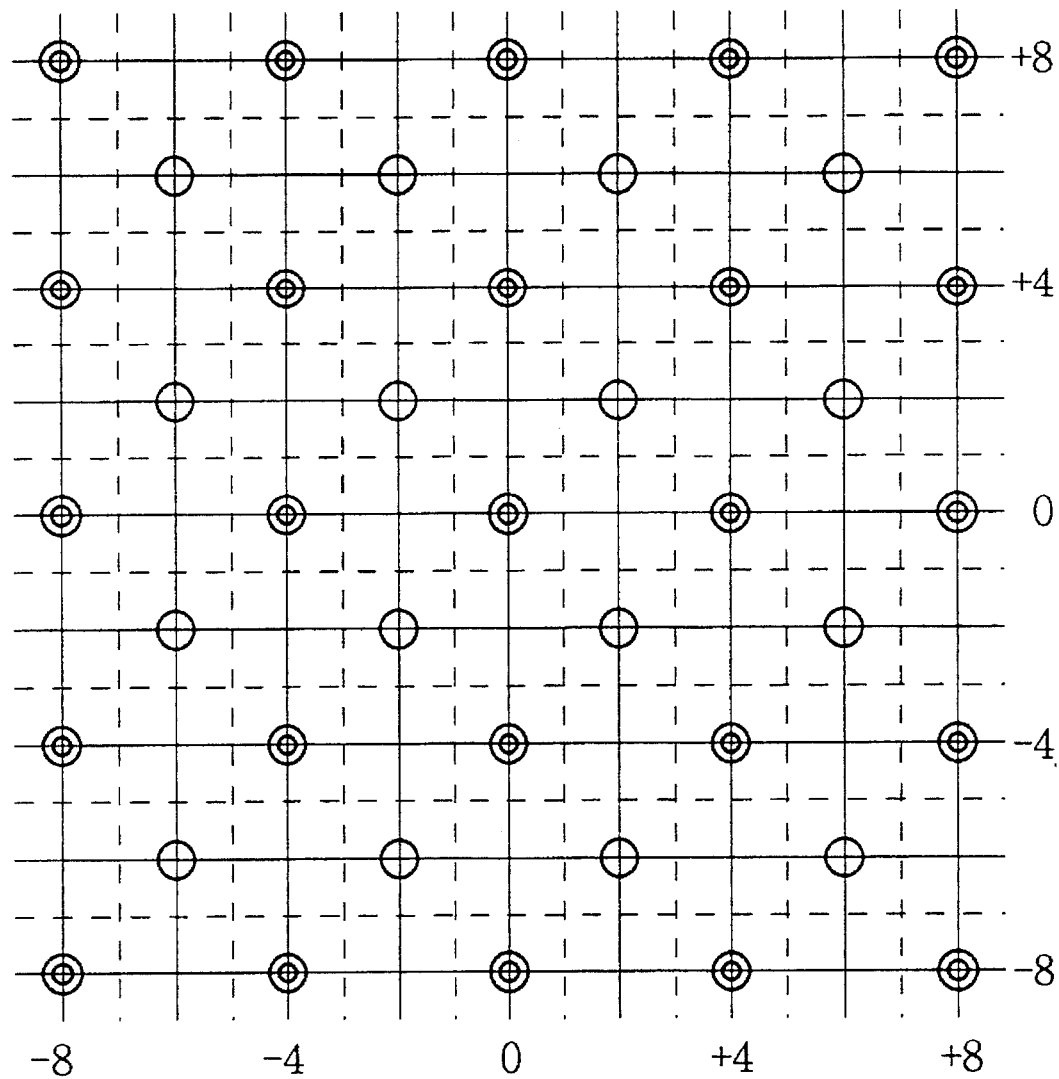
FIG. 9 is a schematic diagram explaining the third hierarchical image data of a second embodiment of this invention.

More particularly, if a description is made with reference to FIG. 9, on the one hand, the amount-of-movement detection in the third hierarchy by a normal hierarchical block matching method is performed only for the positions marked "⊙", when the search range was. ±8 in both the horizontal and vertical directions. On the other hand, in the second embodiment, in addition to the positions marked "⊙", the third hierarchical image data ("₀") adjacent in the oblique direction of the normal third hierarchical image data ("⊙") is generated by overlapping and selecting predetermined image data of a lower hierarchy, and the amount of movement is detected based on these two types of pixel data. Therefore, even if the block phase changes in both the vertical and horizontal directions in which an amount of information is most easily lost in the hierarchical block matching method, a reduction in the amount of information of a higher hierarchy could be reduced and the accuracy of detection of the amount of movement can be enhanced.

According to the above-described construction, higher hierarchical image data multiplexed in the oblique direction is generated by selecting predetermined pixels overlapping with each other from a lower hierarchical image data and obtaining an average value thereof, and, in that higher hierarchical data, the amount of movement is detected with finer than 1-pixel accuracy. Thereby, accuracy in the detection of the amount-of-movement can be enhanced and also the amount of calculation can be reduced.

(3) Third Embodiment

Figure 10:
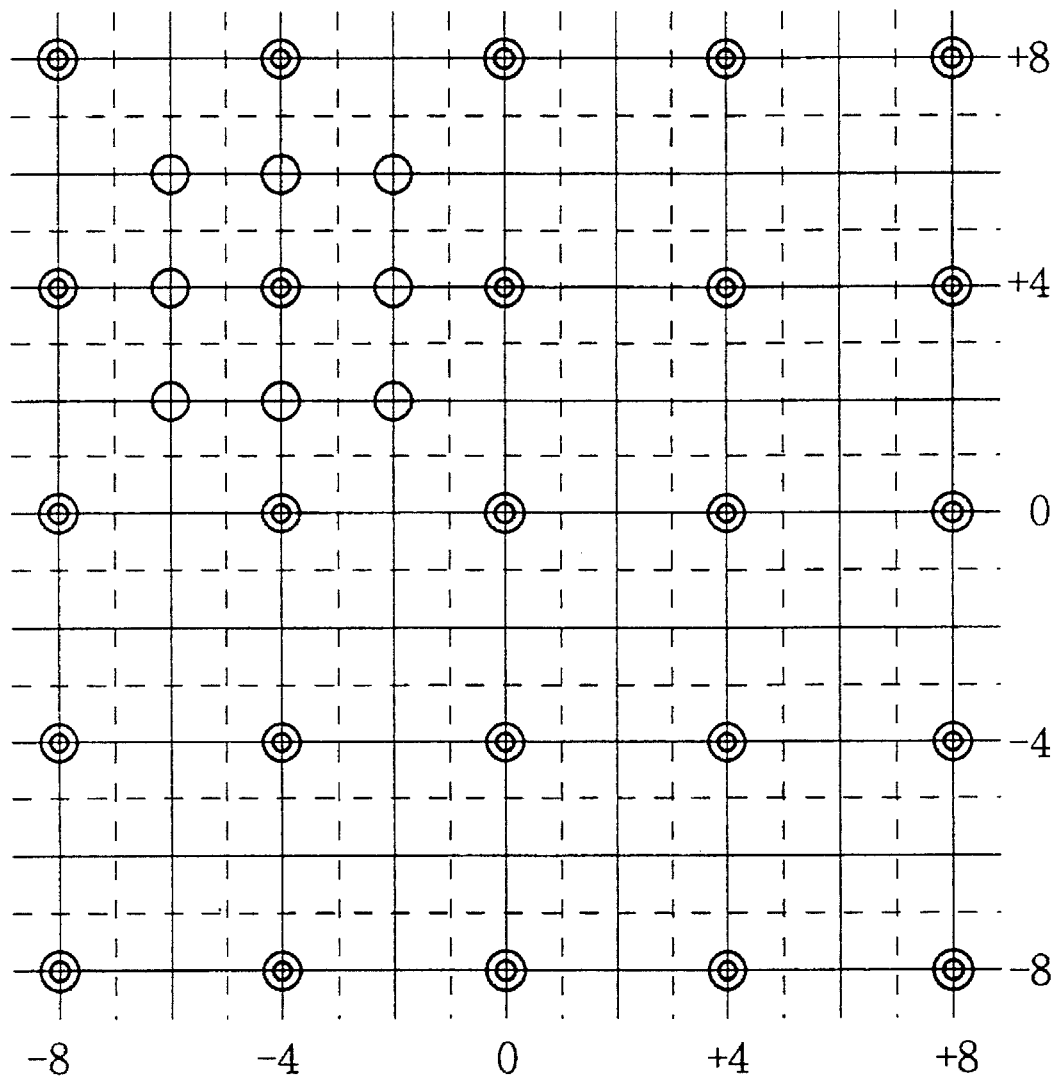
FIG. 10 is a schematic diagram explaining the third hierarchical image data of a third embodiment of this invention.

In the above-described first and second embodiments, accuracy in the detection of the amount of movement has been enhanced by generating third hierarchical image data $S3_{n-1}$ of a structure multiplexed in advance. However, in this third embodiment, the same processing as the amount-of-movement detection of the third hierarchy by normal hierarchical block matching is first performed as a first step. More particularly, the amount-of-movement detection is performed by using only the pixel marked "⊙" in FIG. 10 as a pixel of a candidate block, and a pixel whose evaluation value is higher among them, i.e., a pixel which can be considered a moving block is selected.

Thereafter, in a second step, the amount-of-movement detection of 0.5-pixel unit is performed on the candidate vector. For example, when the motion vector detected in the first step is (−1, 1), in the second step, the amount of movement is detected only at the position marked "₀" of FIG. 10. Therefore, in the amount-of-movement detection device of the third embodiment, an increase in the amount of calculation in the third hierarchy can be greatly reduced.

More particularly, in the amount-of-movement detection device of the third embodiment, the evaluation values of the motion vector detected in the first step and the 8 positions searched in the second step are compared, and the highest evaluation value is used as an amount of movement in the third hierarchy.

Figure 11:
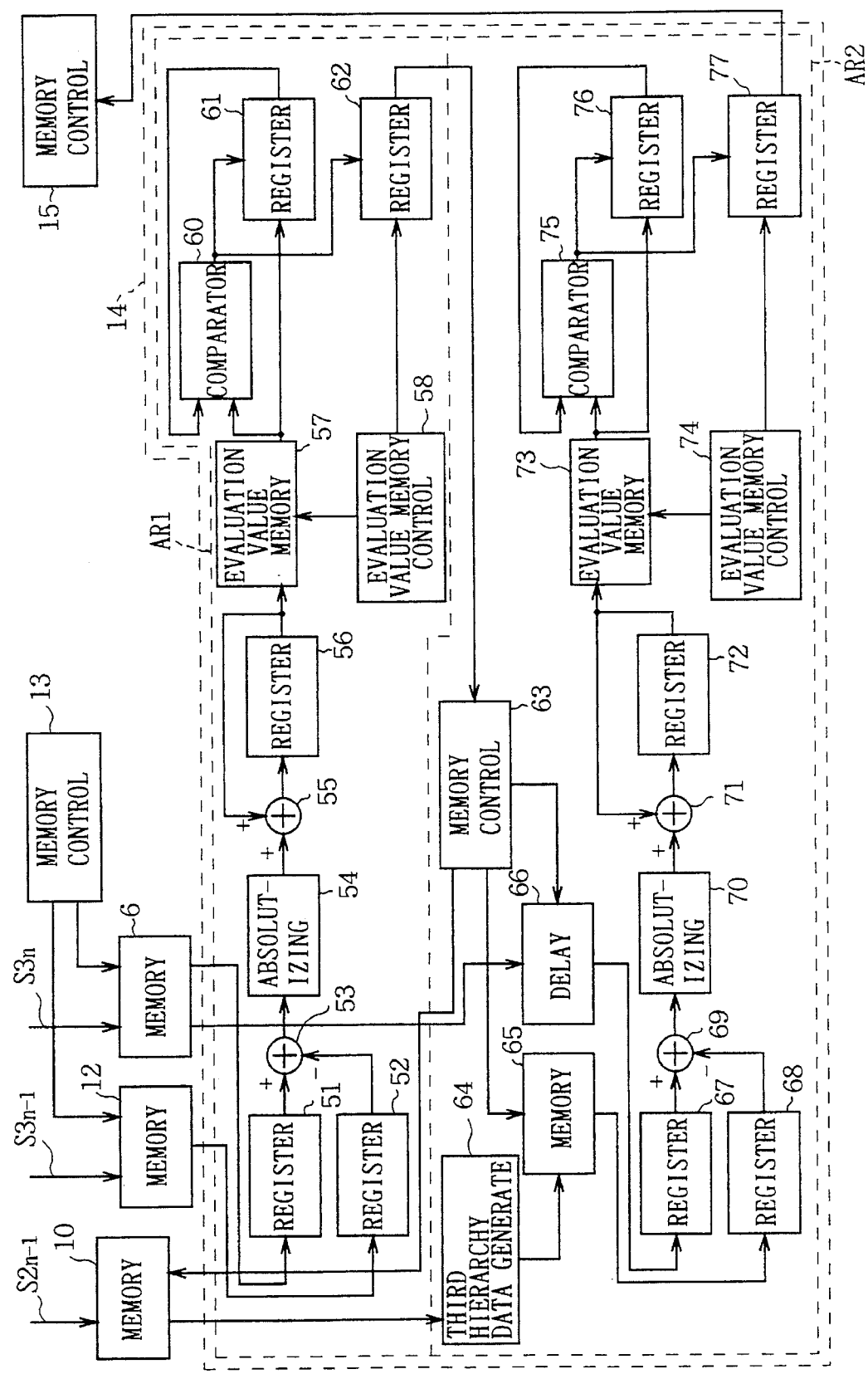
FIG. 11 is a block diagram showing the construction of an amount-of-movement detection circuit of a third embodiment of this invention.

In fact, the amount-of-movement detection of the third hierarchy of the third embodiment is realized by a circuit such as that shown in FIG. 11. More particularly, in FIG. 11, in which the same reference numerals are applied to the sections corresponding to FIG. 1, the third hierarchy amount-of-movement detection circuit 14 detects the amount of movement of the third hierarchy by executing the first step at a section indicated by AR1 and executing the second step at a section indicated by AR2.

A block address, on the one hand, is first output from a memory control circuit 13 to a memory 6 in which third hierarchical image data $S3_n$ has been stored and then the pixel data of a reference block, which is a standard for obtaining the amount of movement, is read from the memory 6. On the other hand, a block address is first output from the memory control circuit 13 to a memory 12 in which third hierarchical image data $S3_{n-1}$ has been stored, and then the pixel data of a candidate block corresponding to block of the third hierarchical image data $S3_n$ read from the memory 6 is read from the memory 12. Hence, in this embodiment, the third hierarchical image data $S3_{n-1}$, which is read from the memory 12, is not third hierarchical image data multiplexed as the first embodiment but normal third hierarchical image data.

The output signal from the memory 6 is supplied through a register 51 to an adder 53, and also the output signal from the memory 12 is supplied through a register 52 to the adder 53. The adder 53 obtains the difference between the pixel corresponding to the third hierarchical image data of the nth frame and the pixel corresponding to the third hierarchical image data of the (n-1)th frame corresponding to the third hierarchical image data of the nth frame. After the difference data for each pixel has been absolutized by an absolutizing circuit 54, the absolutized data is accumulated in an adder 55 and a register 56. The operation of Equation (6) is executed in this way, and the resultant evaluation value is input to an evaluation value memory 57.

The evaluation value stored in the evaluation value memory 57 is read according to an address specified by an evaluation value memory control circuit 58 and is input to a comparator 60 and a register 61.

The comparator 60 successively compares the other input thereof with the evaluation value read by the evaluation value memory 57 and, when the input evaluation value is smaller, it outputs a signal for updating the contents of registers 61 and 62.

Addresses for reading the evaluation value memory 57 are set in sequence to this register 62. The evaluation values stored in sequence in the evaluation value memory 57 in this way are evaluated, an address giving the minimum of the evaluation value is sent from the register 62, and this is supplied as a motion vector to a memory control circuit 63. The processing of the first step is executed in this way.

When the first step is completed, an address signal is sent from the memory control circuit 63 to a memory 10. This is for performing the detection of movement of 0.5-pixel accuracy around the vector obtained in the first step, and the memory 10 supplies the second hierarchical data based on the address signal to a third hierarchical data generation circuit 64.

The third hierarchical data generation circuit 64 is basically identical in operation with the third hierarchical data generation circuit 11 described in FIG. 1, and the third hierarchical data multiplexed are generated from the second hierarchical data. On the one hand, the third hierarchical data generation circuit 64 generates the third hierarchical data by performing an operation such as that shown in Equation (5) and stores it in a memory 65 once. However, since data such as $Z_{n-1(1, 1)}$ has been generated in the third hierarchical data generation circuit 11 and is not used hereinafter, it is not generated here. On the other hand, the output signal from the memory 6, i.e., the third hierarchical data of the block of a current frame being monitored is supplied through a delay circuit (DL) 66 and a register 67 to an adder 69. Also, the output signal from the memory 65 is supplied through a register 68 to the adder 69.

The adder 69 obtains the difference between the pixel corresponding to the third hierarchical image data of the nth frame and the pixel corresponding to the third hierarchical image data of the (n-1)th frame, corresponding to the third hierarchical image data of the nth frame. After the difference data for each pixel has been absolutized by an absolutizing circuit 70, the absolutized data is accumulated in an adder 71 and a register 72. The operation of Equation (7) is executed in this way, and the resultant evaluation value is input to an evaluation value memory 73.

The evaluation value memory 73 stores an evaluation value, which is an accumulative addition value of an absolute value of a difference between blocks having an offset of 0.5 pixel. The evaluation value stored in the evaluation value memory 73 is read according to an address specified by an evaluation value memory control circuit 74 and is input to a comparator 75 and a register 76.

The comparator 75 successively compares the other input thereof with the evaluation value read by the evaluation value memory 73 and, when the input evaluation value is smaller, it outputs a signal for updating the contents of registers 76 and 77.

Addresses for reading the evaluation value memory 73 are set in sequence to the register 77. The evaluation values stored in sequence in the evaluation value memory 73 in this way are evaluated, an address giving the minimum of the evaluation value is sent from the register 77, and this is supplied as a motion vector of the third hierarchy to the memory control circuit 15 for the amount-of-movement detection of the second hierarchy. With this, the processing in the second step is completed.

Thereafter, the amount-of-movement detection device of the third embodiment detects the final amount of movement of the first hierarchical image by performing the same processing as the first embodiment.

According to the above-described construction, normal amount-of-movement detection of the third hierarchy is performed by the first step, and for the periphery of a pixel whose amount of movement is considered large based on this detection result, a higher hierarchical data multiplexed about that periphery is generated by the second step. In that higher hierarchical data, the amount of movement is detected with accuracy finer than one-pixel accuracy. Thereby, accuracy in the detection of the amount-of-movement can be enhanced and the amount of calculation can be reduced effectively.

(4) Fourth Embodiment

While it has been described in the above first, second, and third embodiments that current frame data is used as a reference block and the amount of movement is obtained by moving by a search range the past frame data generated by multiplexing, in this fourth embodiment, the current frame data, which become a reference block, is multiplexed.

In addition to this, in the fourth embodiment all of the hierarchical images of one frame are not generated in advance but the hierarchical image is generated for each block being monitored. Therefore, in the amount-of-movement detection device of the fourth embodiment, accuracy in the detection of the amount of movement can be enhanced with the state in which an overall amount of calculation and an amount of memory used have been reduced.

That is, in the amount-of-movement detection device of the fourth embodiment, second hierarchical data is generated by the second hierarchical data generation circuit 3 of FIG. 1 only for peripheral data of a block being currently monitored among current frame data. More particularly, when the size of the first hierarchical block whose amount of movement is obtained 8×8, the second hierarchical block size becomes 4×4 but there is generated data of 6×6 which is enlarged one pixel by one pixel in the up and down directions and right and left directions. That is, some other peripheral block data is also used.

The output signal of the second hierarchical data generation circuit 3 is supplied to the memory 4, and the output signal of the memory 4 is supplied to the third hierarchical data generation circuit 5. The third hierarchical data generation circuit 5 generates the third hierarchical image data from the supplied second hierarchical image data. More particularly, one pixel of third hierarchical image data is generated by calculating an average value from the image data of a small region of 2×2 of second hierarchical image data.

The third hierarchical data generation circuit 5 generates third hierarchical data only for peripheral data of a block being currently monitored. More particularly, when the size of the block whose amount of movement obtained is 8×8, the third hierarchical block size becomes 2×2, but data of 4×4 which is enlarged one pixel by one pixel in the up and down directions and right and left directions is generated based on second hierarchical data of 6×6 supplied from the second hierarchical data generation circuit 3. That is, third hierarchical image data of a current frame multiplexed is generated by using some peripheral data as well.

For example, the third hierarchical data generation circuit 5 generates not only normal third hierarchical image data such as that shown by Equation (2) but also data that is shifted in phase to be positioned midway between the image data generated with Equation (2).

Also, in this embodiment, the second hierarchical data generation circuit 9 generates the second hierarchical data for data in a range in which a block being currently monitored is moved by a predetermined search range. Further, the third hierarchical data generation circuit 11 does not generate third hierarchical image data multiplexed but generates normal third hierarchical image data.

Therefore, in the third hierarchical data generation circuit 14 of the fourth embodiment, an evaluation value in offset coordinates (x, y) is obtained by the following equation:

$$E_{(0,0)} = |Z_{n(1,1)} - Z_{n-1(1,1)}| + |Z_{n(2,1)} - Z_{n-1(2,1)}| + |Z_{n(1,2)} - Z_{n-1(1,2)}| + |Z_{n(2,2)} - Z_{n-1(2,2)}|$$

$$E_{(0.5,0)} = |Z_{n(0.5,1)} - Z_{n-1(1,1)}| + |Z_{n(1.5,1)} - Z_{n-1(2,1)}| + |Z_{n(0.5,2)} - Z_{n-1(1,2)}| +$$

$|Z_{n(1.5,2)} - Z_{n-1(2,2)}|$ $E_{(0,0.5)} = |Z_{n(1,0.5)} - Z_{n-1(1,1)}| + |Z_{n(2,0.5)} - Z_{n-1(2,1)}| + |Z_{n(1,1.5)} - Z_{n-1(1,2)}| + |Z_{n(2,1.5)} - Z_{n-1(2,2)}|$ $E_{(0.5,0.5)} = |Z_{n(0.5,0.5)} - Z_{n-1(1,1)}| + |Z_{n(1.5,0.5)} - Z_{n-1(2,1)}| + |Z_{(0.5,1.5)} - Z_{n-1(1,2)}| + |Z_{n(1.5,1.5)} - Z_{n-1(2,2)}|$ \hfill (8)

In order to reduce memory for hierarchical data storage, a method cannot be used for generating hierarchical data of one frame in advance. Therefore, a method of generating data each time for peripheral data of a block being monitored is advantageous in that the amount of a memory used is reduced.

However, in a method in which current frame data is used as reference data and past frame data is moved by a search range, when hierarchical data are multiplexed and an amount of movement of less than one pixel is detected, the amount of calculation for multiplexing past frame data is increased. Particularly, as the search range becomes larger, the amount of calculation is increased.

In view of this, in the fourth embodiment, hierarchical data is generated for each block being monitored, and current frame data which become a reference block is also multiplexed. Therefore, in the fourth embodiment, the amount of calculation required for generating hierarchical data can be greatly reduced and the amount of memory used can also be greatly reduced.

According to the above-described construction, hierarchy data is generated for each block being monitored, and higher hierarchical data multiplexed is generated for current frame data which becomes a reference block. In this higher hierarchical data, the amount of movement is detected with accuracy finer than one-pixel accuracy. Thereby, accuracy in the detection of the amount of movement can be enhanced and also the amount of calculation and the amount of memory used can be reduced.

(5) Fifth Embodiment

In a amount-of-movement detection method of this fifth embodiment, higher hierarchical data multiplexed is generated from lower hierarchical data overlapped and the amount of movement is detected with the higher hierarchical data multiplexed, as in the first embodiment. In addition to this, activity information reflecting the high-frequency component of an image is also hierarchized and reference is made to an evaluation value in this activity information so that the amount of movement can be detected with a higher degree of accuracy.

More particularly, in the amount-of-movement detection method of the fifth embodiment, image data of plural hierarchies is formed for an base image by an average value hierarchization method, and data indicating of a high-frequency component of each hierarchy (hereinafter referred to as "activity") is also hierarchized (activity hierarchization) to form activity data, and the amount of movement is detected for each hierarchy with these data.

In fact, for image data and activity data hierarchized, an evaluation value is obtained in sequence in order of higher hierarchy by a block matching method. The amount of movement is obtained by determining these values uniformly. By making compensation for this amount of movement and making reference to it when the evaluation values of lower hierarchies are obtained in sequence, a final amount of movement of the base image is detected.

Figure 12A:
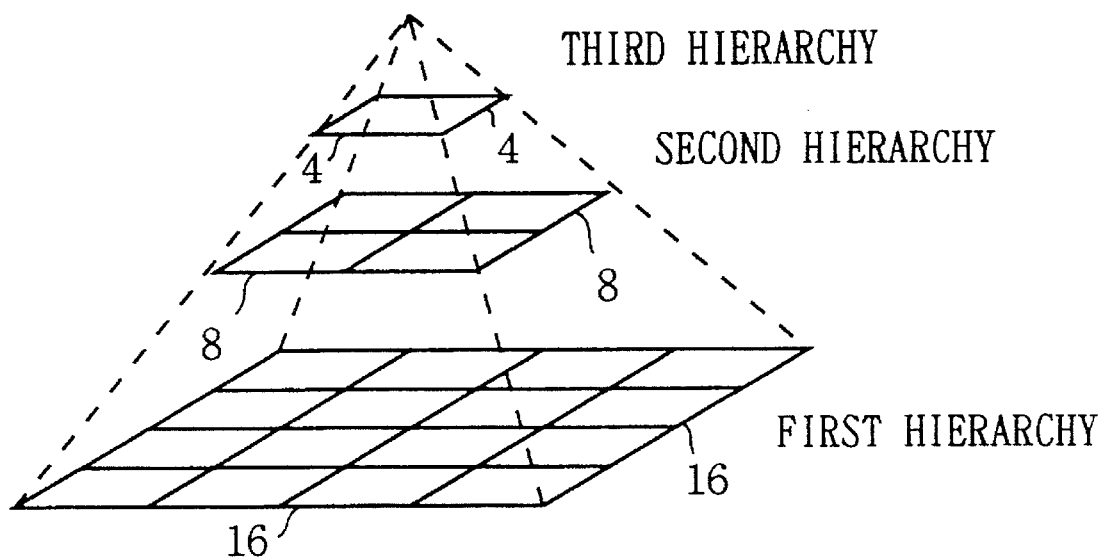
Figure 12B:
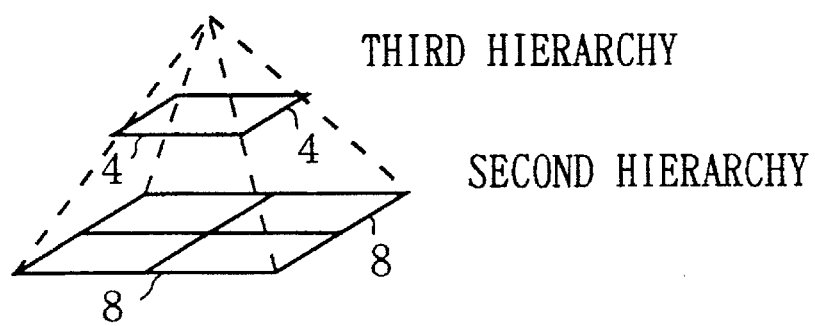

An example of hierarchized image data generation is shown in FIGS. 12A and 12B. FIG. 12A illustrates the case in which image data hierarchized into three hierarchies is generated for a base image, and the first hierarchy is the base image. If image data of a higher hierarchy than the block, e.g., 16×16, in the base image, i.e., image data on the n-th hierarchy, is expressed by $M_n(x, y)$, it can be obtained by taking an average like the following equation:

$$M_n(x, y) = \frac{1}{4} \sum_{i=0}^{1} \sum_{i=0}^{1} M_{n-1}(2x + i, 2y + j) \qquad (9)$$

The block size becomes ½ in the horizontal and vertical directions, respectively. Also, when the image data of the second hierarchy is generated from the image data of the first hierarchy averaged in this way, they are also obtained in the same way by Equation (9).

While, in the amount-of-movement detection methods of the first to fourth embodiments using an hierarchical image, only the average value hierarchizing of FIG. 12A is performed, in this embodiment, the image data hierarchized and averaged by Equation (9) is generated and, at the same time, activity data is generated by activity-hierarchizing the image data hierarchized and averaged as shown in FIG. 12B. If the activity data of the second hierarchy is expressed by $\Delta 2(x, y)$, it is obtained by the following equation:

$$\Delta_2(x, y) = \frac{1}{4} \sum_{i=0}^{1} \sum_{i=0}^{1} |M_1(2x + i, 2y + j) - M_2(x, y)| \qquad (10)$$

by a sum of absolute values of differences between corresponding pixels of the base image from the image data hierarchized and averaged. Likewise, the activity data of the third hierarchy $\Delta 3(x, y)$ is obtained by the following equation:

$$\Delta_3(x, y) = \frac{1}{16} \sum_{i=0}^{3} \sum_{i=0}^{3} |M_1(4x + i, 4y + j) - M_3(x, y)| \qquad (11)$$

High-frequency components faithful to the base image can be extracted by obtaining all of the activity data based on the base image.

If the activity data is obtained in this way, the hierarchical structure becomes as shown in FIG. 12B and have hierarchical planes other than the lowest hierarchy. This activity data is to reflect a feature amount that is omitted in the image data when the average-value hierarchization was made.

Figures 13A, 13B:
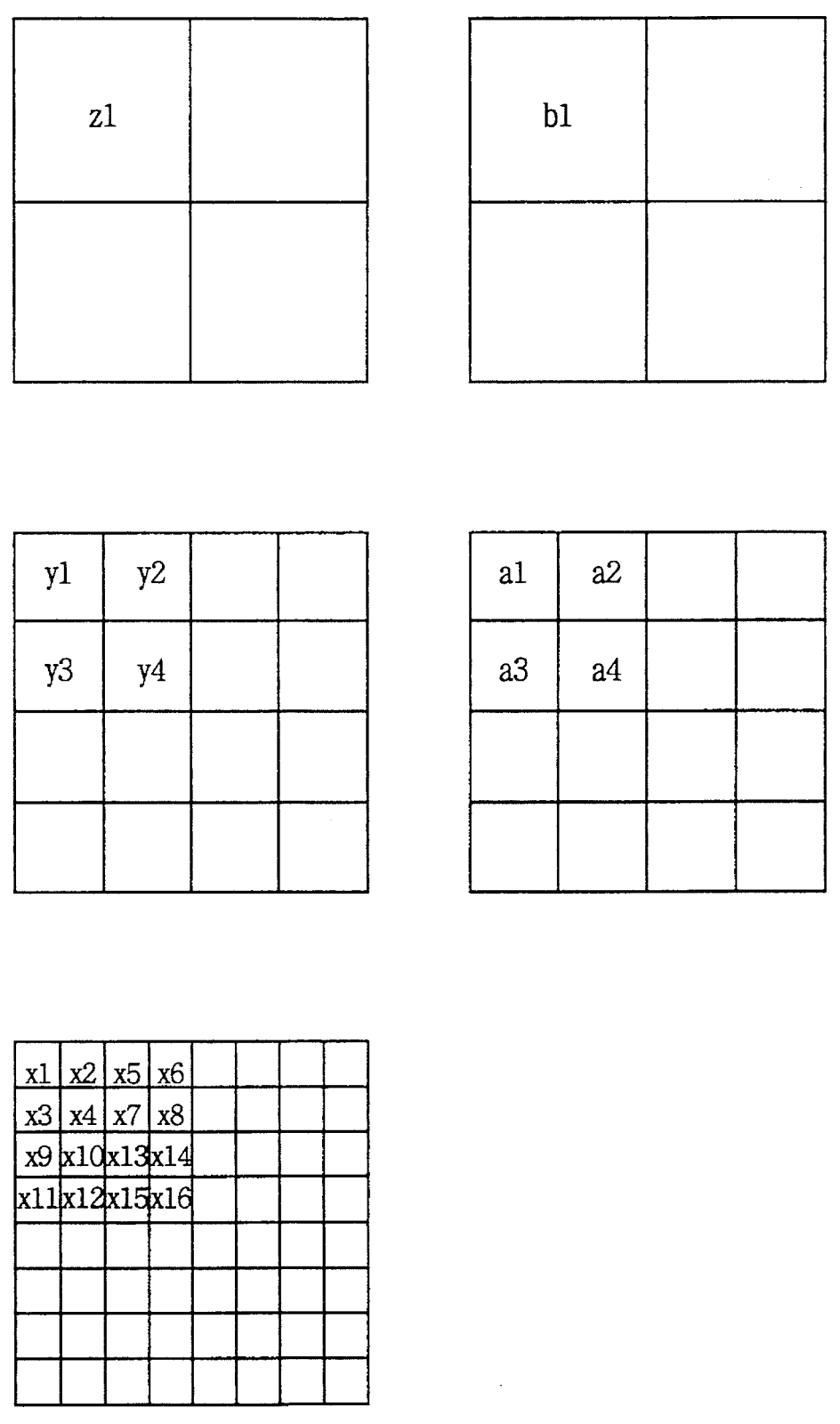

For example, when a block comprising pixels x1, x2, . . . , x15, and x16 of the image data of the base image such as that shown in FIGS. 13A and 13B is hierarchized as a first hierarchy, pixels y1, y2, y3, and y4 in the image data of the second hierarchy of the average-value hierarchizing is obtained, based on Equation (9), by the following equation:

$Y1=(x1+x2+x3+x4)/4$ $y2=(x5+x6+x7+x8)/4$ $y3=(x9+x10+x11+x12)/4$ $y4=(x13+x14+x15+x16)/4$ \hfill (12)

Further, pixel z1 in the image data of the third hierarchy in which the average-value hierarchization was made is also obtained, based on Equation (9), by the following equation:

$Z1=(y1+y2+y3+y4)/4$ \hfill (13)

Also, in a similar way, the activity data of the second hierarchy of the activity hierarchization is obtained, based on Equation (10), with pixels y1, y2, y3, and y4 in the image data of the second hierarchy in which the average-value hierarchization was made and with pixels x1, x2, . . . , x15, and x16 of the image data of the first hierarchy by the following equation:

$$a1=(|y1-x1|+|y1-x2|+|y1-x3|+|y1-x4|)/4$$

$$a2=(|y2-x5|+|y2-x6|+|y2-x7|+|y2-x8|)/4$$

$$a3=(|y3-x9|+|y3-x10|+|y3-x11|+|y3-x12|)/4$$

$$a4=(|y4-x13|+|y4-x14|+|y4-x15|+|y4-x16|)/ \quad (14)$$

Further, the activity data of the third hierarchy in which the activity hierarchization was made are obtained, based on Equation (11), with pixel z1 of the image data of the third hierarchy in which the average-value hierarchization was made and with pixels x1, x2, ..., x15, and x16 of the image data of the first hierarchy by the following equation:

$$\begin{aligned} b1 = \ & (|z1-x1|+|z1-x2|+|z1-x3|+ \\ & |z1-x4|+|z1-x5|+|z1-x6|+ \\ & |z1-x7|+|z1-z8|+|z1-x9|+ \\ & |z1-z10|+|z1-x11|+|z1-x12|+ \\ & |z1-x13|+|z1-x14|+|z1-x15|+ \\ & |z1-x16|)/16 \end{aligned} \quad (15)$$

With the average-value hierarchized image data and the activity-hierarchized activity data obtained as described above, an amount-of-movement detection by a block matching method is performed at each hierarchy. More particularly, if a current field is expressed by "t", the evaluation function of the block matching will be expressed by the following equation:

$$E(Y)_n(u_n, v_n) = \sum_x \sum_y |M_n^{t-2}(x - u_n - 2u_{n+1}, y - v_n - 2v_{n+1}) - M_n^t(x, y)| \quad (16)$$

where $(u_n, v_n)$ represents the amount of movement at the n-th hierarchy $V'_n=(u_n, v_n)$ giving the minimum of this evaluation function $E(Y)_n$ is assumed to be the amount of movement. The amount of movement $V_n$ at a current hierarchy gives a final amount of movement from the relationship of the following equation:

$$V_n = V'_n + 2V_{n+1} \quad (17)$$

The evaluation function of this embodiment is expressed by the following equation:

$$E(D)_n(u_n, v_n) = \sum_x \sum_y |\Delta_n^{t-2}(x - u_n - 2u_{n+1}, y - v_n - 2v_{n+1}) - \Delta_n^t(x, y)| \quad (18)$$

the activity data of FIG. 12B is evaluated by Equation (16). New evaluation function $E(G)_n$ is expressed by the following equation:

$$E(G)_n = w_1 \cdot E(Y)_n + w_2 \cdot E(D)_n \quad (19)$$

where $w_1$ and $w_2$ are weight coefficients. The amount of movement giving the minimum of evaluation function $E(G)_n$ is obtained. Note that, in the lowest hierarchy, only evaluation by evaluation function $E(Y)_n$ of Equation (16) is performed since activity data does not exist.

By evaluating with both the average-value hierarchized image data and the activity-hierarchized activity data, even if one optimum evaluation value of the hierarchy is an erroneous detection, accurate detection can be made with another evaluation value. Therefore, accuracy in the detection of the amount of movement at each hierarchy is enhanced. If the accuracy in the detection of the amount of movement at each hierarchy is enhanced, the final amount of movement obtained by Equation (17) will also be enhanced.

Figure 14:
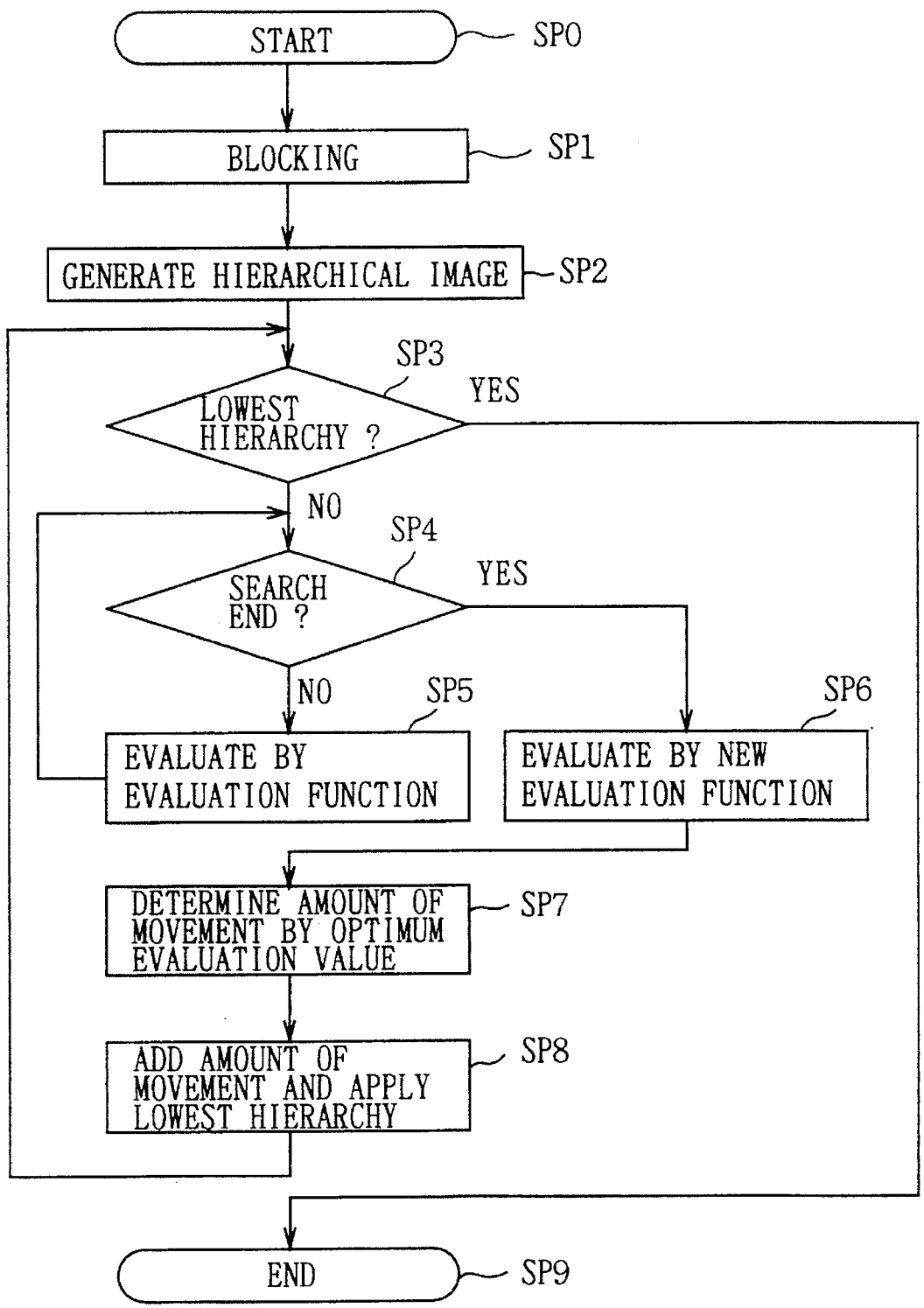
FIG. 14 is a flowchart showing amount-of-movement detection processing procedure of the fifth embodiment.

The amount-of-movement detection processing procedure SP0 of this embodiment is shown in FIG. 14. In step SP1, a base image on two screens that are compared is blocked. In step SP2, the image data of the first hierarchy, the second hierarchy, and the third hierarchy is generated by average-value hierarchizing the blocked base image according to Equation (9) and also the activity data of the second hierarchy and the third hierarchy is generated by activity-hierarchizing the blocked base image according to Equations (10) and (11).

In step SP3, it is determined whether the currently processed hierarchy is the lowest hierarchy. If a negative result is obtained, it is determined in step SP4 if searching has ended for all search regions. If a negative result is obtained, in step SP5 the evaluation by evaluation functions $E(Y)_n$ and $E(D)_n$ described with reference to Equations (16) and (18) is performed with the current and past data of the image data and the activity data, and step SP5 returns to step SP4.

If an affirmative result is obtained in step SP4, step SP4 proceeds to step SP6 to perform the evaluation by new evaluation function $E(G)_n$, which is obtained by Equation (19) with evaluation functions $E(Y)_n$ and $E(D)_n$ obtained for the image data and the activity data of a predetermined hierarchy, in order to obtain an optimum evaluation value, and step SP6 proceeds to step SP7. In step SP7, the amount of movement is determined by the optimum evaluation value, in step SP8 the amount of movement is added to be applied to lower hierarchies, and step SP8 returns to step SP3. If a negative result is obtained in step SP3, step SP3 proceeds to step SP9, in which processing procedure SP0 of the amount-of-movement detection method is terminated.

Thus, in the search within the searching region, by uniformly determining by Equation (19), an optimum amount of movement is obtained the evaluation value of the image data which has been average-value-hierarchized from the highest hierarchy and the evaluation value of the activity data which has been activity-hierarchized, and a final amount of movement is obtained by repeating the process up to the lowest hierarchy by applying the amount of movement obtained by Equation (17) to lower hierarchies. In this manner, the amount of movement is obtained by comparing the amount of movement obtained only with the image data of the average-value hierarchization and by taking into consideration the evaluation value obtained by the activity data comprising the high-frequency components of each hierarchy, so that the error determination by the method of taking an average can be effectively prevented and, therefore, the amount of movement can be detected with a high degree of accuracy.

Figure 15:
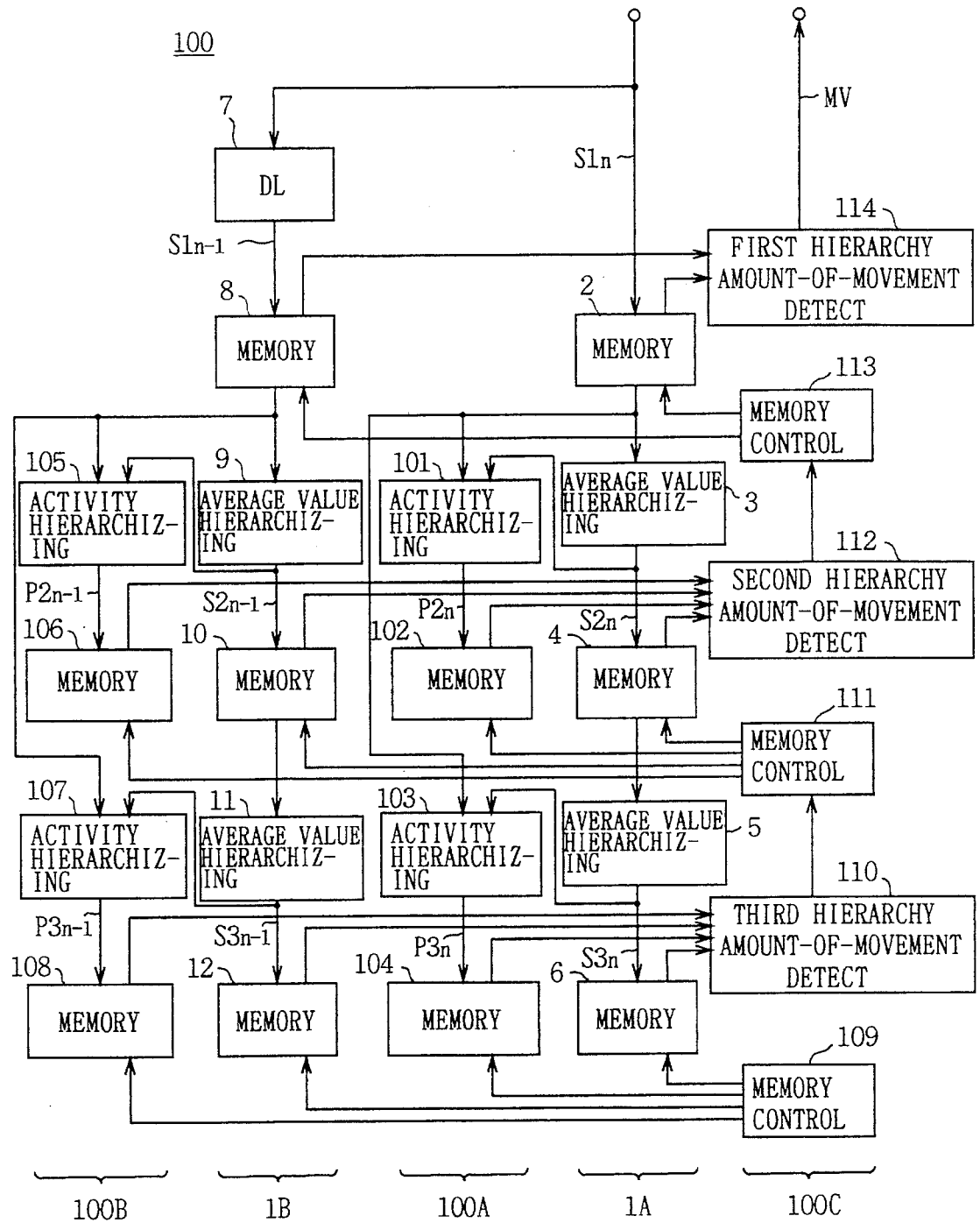
FIG. 15 is a block diagram showing an amount-of-movement detection device of the fifth embodiment.

The amount-of-movement detection device, which uses the amount-of-movement detection method of this embodiment, is constructed as shown in FIG. 15. It is to be noted that the same reference numerals will be applied to the corresponding sections as in FIG. 1. Average-value hierarchization circuits 3, 5, 9, and 11 of FIG. 15 are identical in construction and operation to the second hierarchical data generation circuit 3, the third hierarchical data generation circuit 5, the second hierarchical data generation circuit 9, and the third hierarchical data generation circuit 11 in FIG. 1.

The amount-of-movement detection device 100, in addition to hierarchy processing sections 1A and 1B, has activity hierarchy processing sections 100A and 100B for generating hierarchized activity data. The amount-of-movement detection device 100 generates hierarchized activity data of a current frame at the activity hierarchy processing section 100A and also generates hierarchized activity data of a previous frame at the activity hierarchy processing section 100B.

An activity hierarchization circuit 101 of the activity hierarchization processing section 100A executes the activity hierarchy processing by Equation (10), with first hierarchical image data $S1_n$ and second hierarchical image data $S2_n$ from the average value hierarchization circuit 3, and then obtains activity data $P2_n$ of the second hierarchy. The activity data $P2_n$ is stored in a memory 102.

An activity hierarchization circuit 103 executes the activity hierarchization processing by Equation (11), with first hierarchical image data $S1_n$ and third hierarchical image data $S3_n$ from the average value hierarchization circuit 5, and then obtains activity data $P3_n$ of the third hierarchy. Activity data $P3_n$ is stored in a memory 104.

Likewise, in the activity hierarchy processing section 100B for generating hierarchized activity data of a previous frame, an activity hierarchization circuit 105 receives first hierarchical image data $S1_{n-1}$ of a previous frame and second hierarchical image data $S2_{n-1}$ from the average value hierarchization circuit 9. The activity hierarchization circuit 105 obtains second hierarchical activity data $P2_{n-1}$ based on Equation (10), with the first hierarchical image data $S1_{n-1}$ and second hierarchical image data $S2_{n-1}$. The activity data $P2_{n-1}$ is stored in a memory 106.

Figure 16A:
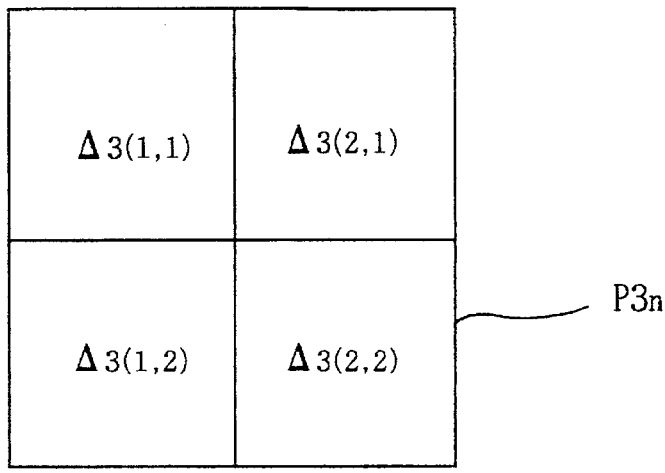
FIGS. 16A and 16B are diagrams explaining the third hierarchical activity data of the nth and (n-1)th frames.
Figure 16B:
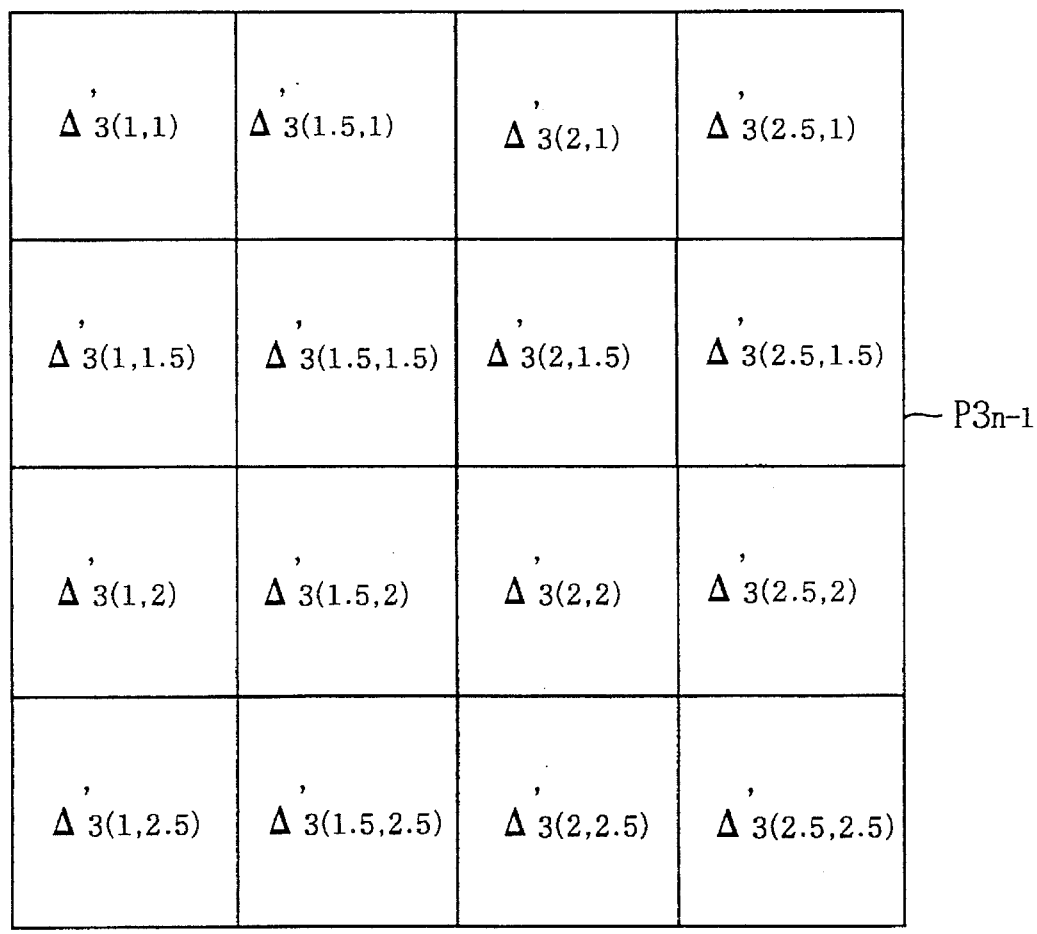

An activity hierarchization circuit 107 obtains third hierarchical activity data $P3_{n-1}$ multiplexed based on Equation (11), with first hierarchical image data $S1_{n-1}$ and multiplexed third hierarchical image data $S3_{n-1}$ from the average value hierarchization circuit 11. Multiplexed activity data $P3_{n-1}$ is stored in a memory 108. Multiplexed third hierarchical activity data $P3_{n-1}$ corresponds to multiplexed third hierarchical image data $S3_{n-1}$ shown in FIG. 3B and can be expressed as shown in FIG. 16B.

The hierarchical image data and the hierarchical activity data stored in each memory in this way is read at each predetermined block of each hierarchy by the amount-of-movement detection section 100C, and the moving quantities is obtained sequentially in order of higher hierarchy.

For actual amount-of-movement detection, in the third hierarchy being the highest hierarchy, the image data of a previous frame stored in the memory 12 and the activity data of a previous frame stored in the memory 108 is first read within a search as candidate blocks, and supplied to a third hierarchy amount-of-movement detection circuit 110. Also, the image data of a current frame stored in the memory 6 and the activity data of a current frame stored in the memory 104 is read as reference blocks, and supplied to the third hierarchy amount-of-movement detection circuit 110.

Such reading of the image data and the activity data of the third hierarchy is performed based on a block address from a memory control circuit 109. The memory control circuit 109 sends to the memories 12 and 108 a block address for reading a candidate block in a search range at a unit of 0.5 pixels. It is to be noted that, for the position of the block that is read at the same point in time by the memory control circuit 109, the memory 6 and the memory 104 are the same position, and the memory 12 and the memory 108 are the same position.

The third hierarchy amount-of-movement detection circuit 110 obtains evaluation values based on evaluation function $E(Y)_3$ of Equation (16) and evaluation function $E(D)_3$ of Equation (18), using the image data and the activity data input to the circuit 110. The evaluation values are weighted according to weight coefficients $w_1$ and $w_2$, as shown in Equation (19), and are added to obtain new evaluation function $E(G)_3$. The amount of movement is detected based on this new evaluation function $E(G)_3$.

Figure 17:
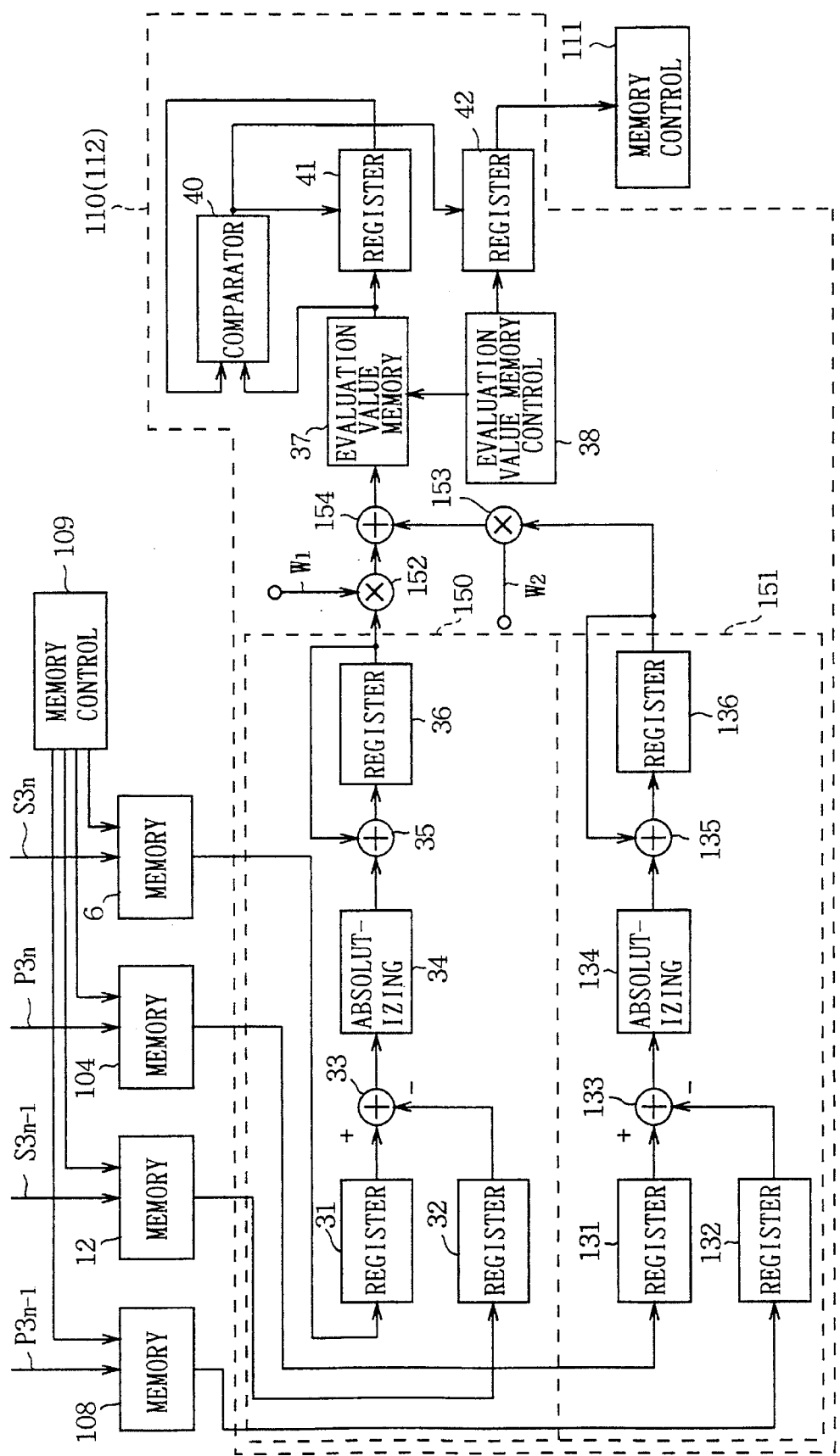
FIG. 17 is a block diagram showing the construction of an amount-of-movement detection circuit in the amount-of-movement detection device of the fifth embodiment.

In fact, the third hierarchy amount-of-movement detection circuit 110 and the second hierarchy amount-of-movement detection circuit 112 are constructed as shown in FIG. 17. Since the second hierarchy amount-of-movement detection circuit 112 is identical in construction to the third hierarchy amount-of-movement detection circuit 110, a description will be made with reference to the third hierarchy amount-of-movement detection circuit 110.

The third hierarchy amount-of-movement detection circuit 110 inputs third hierarchical image data $S3_n$ and $S3_{n-1}$ from the memories 6 and 12 to the registers 31 and 32 of an image data evaluation value calculating section 150. This image data evaluation value calculation section 150 executes the same accumulative addition processing as the first embodiment and outputs, from a register 36 thereof, an evaluation value for average value image data. Thus, the operation of Equation (16) is executed in the image data evaluation value calculation section 150.

The third hierarchy amount-of-movement detection circuit 110 also inputs third hierarchical activity data $P3_n$ and $P3_{n-1}$ from the memories 104 and 108 to registers 131 and 132 of an activity data evaluation value calculation section 151. This activity data evaluation value calculation section 151 executes similar accumulative addition processing for activity data $P3_n$ and $P3_{n-1}$, as the image data evaluation value calculation section 150 did for image data $S3_n$ and $S3_{n-1}$, and outputs, from a register 136 thereof, an evaluation value for activity data. Thus, the operation of Equation (18) is executed in the activity data evaluation value calculation section 151.

The evaluation value for average value image data output from the image data evaluation value calculation section 150 is multiplied by weight function $w_1$ in a subsequent multiplication circuit 152 and then supplied to an addition circuit 154. Also, the evaluation value for activity data output from the activity data evaluation value calculation section 151 is multiplied by weight function $w_2$ in a subsequent multiplication circuit 153 and then supplied to the addition circuit 154. As a result, the addition based on Equation (19) is executed in the addition circuit 154, and the result of the addition is supplied as a new evaluation value to an evaluation value memory 37.

The Evaluation value memory 37, an evaluation value memory control circuit 38, a comparison circuit 40, a register 41, and a register 42 of FIG. 17 are identical in construction to those of the first embodiment described with reference to FIG. 7, and an address giving the minimum of a new evaluation value, which takes the evaluation value of the activity data into consideration, is finally output from the register 2. This address is supplied as a motion vector of the third hierarchy to a memory control circuit 111 of the second hierarchy.

The memory control circuit 111 outputs a block address to the memories 10 and 106 so that the search range becomes (±1) from a position offset by the amount that the amount of movement in the third hierarchy is converted to the scale of the second hierarchy. Second hierarchical image data $S2_{n-1}$ and second hierarchical activity data $P2_{n-1}$, which are read from the memories 10 and 106 based on this block address, are sent to the second hierarchy amount-of-movement detection circuit 112.

The second hierarchy amount-of-movement detection circuit 112, as with the third hierarchy amount-of-movement detection circuit 110, detects the motion vector of the second hierarchy based on a new evaluation value, which takes into consideration the evaluation value of the activity data as well as the evaluation value of the image data, and sends the result of the detection to a memory control circuit 113 of the first hierarchy. It is to be noted that, in the detection of the amount of movement of the second hierarchy, since the image data and the activity data multiplexed as the third hierarchy do not exist, the block matching is performed not at a unit of 0.5 pixel but at a unit of one pixel.

The memory control circuit 113 outputs a block address to the memory 8 so that the search range becomes (±1) from a position offset by the amount that the amount of movement in the second hierarchy is converted to the scale of the first hierarchy. First hierarchical image data $S1_{n-1}$, which is read from the memory 8 based on this block address, is sent to a first hierarchy amount-of-movement detection circuit 114.

The first hierarchy amount-of-movement detection circuit 114 is identical in construction to the amount-of-movement detection circuit 14 of the first embodiment described with reference to FIG. 7, and detects the amount of movement based on only the evaluation value of the image data. The first hierarchy amount-of-movement detection circuit 114 adds up this amount of movement in the first hierarchy and the previously obtained amount of movement in the second hierarchy converted to the scale of the first hierarchy, and this is output through an output terminal as a final amount of movement MV in the first hierarchy.

In the above-described construction, the amount-of-movement detection device 100 of the fifth embodiment, in addition to hierarchical image data $S2_n$, $S2_{n-1}$, $S3_n$, and $S3_{n-1}$ by the value-averaging operation, generates hierarchical activity data $P2_n$, $P2_{n-1}$, $P3_n$, and $P3_{n-1}$, which reflect the transient component of an image. Further, image data $S3_{n-1}$ and activity data $P3_{n-1}$ of the third hierarchy, which is the highest hierarchy, are multiplexed and generated.

The amount-of-movement detection device 100 obtains the amount of movement in the third hierarchy, by separating the candidate block from multiplexed image data $S3_{n-1}$ and activity data $P3_{n-1}$ and also the reference block from image data $S3_n$ and activity data $P3_n$, in the third hierarchy, and by uniformly determining them by block matching. Therefore, accuracy in the detection of the amount of movement can be greatly enhanced compared to the case in which only the average-value hierarchy image is used.

The amount-of-movement detection device 100 obtains the amount of movement in the second hierarchy, by making compensation for the amount of movement in the third hierarchy and separating the candidate block from image data $S2_{n-1}$ and activity data $P2_{n-1}$ and also the reference block from image data $S2_n$ and activity data $P2_n$, in the second hierarchy, and by uniformly determining them by block matching. As a result, accuracy in the detection of the amount of movement in the second hierarchy can also be enhanced. The amount-of-movement detection device 100 finally makes compensation for the movement of the amount of movement in the second hierarchy and then obtains the amount of movement of the first hierarchy. This is output as a final amount of movement MV.

According to the above-described construction, hierarchized activity data $P2_n$, $P2_{n-1}$, $P3_n$, and $P3_{n-1}$ are generated in addition to generating multiplexed data $S3_{n-1}$ of the highest hierarchy, and the amount of movement is obtained by uniformly determining in each hierarchy the hierarchical image data and the hierarchical activity data by block matching. Therefore, accuracy in the detection of the amount of movement for a final base image can be further enhanced.

(6) Other Embodiments (6-1) While, in the above-described embodiments, the image data of three hierarchies has been generated from a base image by an average-value hierarchization method, the number of hierarchies is not limited to this, but the same effect as the above-described embodiments can be obtained even two hierarchies or more than three hierarchies. Also, while, in the average-value hierarchization, one block of a higher hierarchy has been generated by taking an average value of the block of 2×2 of a lower higher hierarchy, this invention is not limited to this block range and the average value. For example, the higher hierarchical data may be generated by smoothing data with a low-pass filter.

(6-2) Also, while, in the above-described embodiments, a sum of absolute values of differences between blocks has been used in the evaluation functions of Equation (6) or (16) in order to obtain an evaluation value for block matching, the same effect as the above-described embodiments can be obtained even if a square sum of differences or correlation coefficients are used as an evaluation function for block matching.

(6-3) Also, while, in the above-described embodiments, the amount-of-movement detection of the 0.5 pixel unit has been performed in higher hierarchies by generating multiplexed data of the higher hierarchies. However, this invention is not limited to the amount-of-movement detection of the 0.5 pixel unit, but it is applicable to an amount-of-movement detection of the 0.25 pixel unit, or an amount-of-movement detection of a further finer unit.

Also, the selection of lower hierarchical data used for multiplexing higher hierarchical data is not only limited to examples of the above-described embodiments. The point here is that multiplexed data of higher hierarchies is generated by selecting higher hierarchical data so that higher hierarchical data overlaps lower hierarchical data.

(6-4) Also, in the above-described embodiments, only third hierarchical image data S3n−1 has been multiplexed. However, this invention is not only limited to this, but second hierarchical data may be multiplexed by selecting second hierarchical image data so that the second hierarchical image data overlaps the first hierarchical image data.

(6-5) Also, in the above-described fifth embodiment, the multiplexed pixels, which are adjacent to normal pixels of the third hierarchy in the vertical, horizontal, and oblique directions as in the first embodiment, have been generated by the average-value hierarchization circuit 11. However, this invention is not only limited to this, but the pixels multiplexed only in the oblique direction as in the second embodiment may be generated.

Also, in the fifth embodiment, two-step processing such as that of the third embodiment may be introduced. If this is done, the amount of calculation in the fifth embodiment can be effectively reduced.

Further, in the fifth embodiment, a method of multiplexing a current frame which becomes a reference block and also generating a hierarchical image for each block being monitored may be introduced, as is the fourth embodiment. If this is done, the amount of calculation and the amount of memory used of the fifth embodiment can be effectively reduced.

(6-6) Also, although, in the above-described fifth embodiment, an average value of the sum of absolute values of differences has been used when activity hierarchization is performed, a standard deviation or a dispersion value may be used to perform activity hierarchization. After the high-frequency component of an image is extracted by using a Laplacian filter in preprocessing, activity hierarchization may be performed. Further, with a dynamic range defined by the difference between the maximum value and the minimum value of a base image, activity hierarchization may be performed.

While where has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A motion vector detection device for detecting a motion vector between a base image and a reference image, comprising:

means for outputting a base lower hierarchical image data having a resolution higher than that of said base image;

means for outputting a base higher hierarchical image data having a resolution lower than that of said base lower hierarchical image data;

means for outputting a reference lower hierarchical image data having a resolution higher than that of said reference image;

means for outputting multiplexed reference data multiplexing a reference higher hierarchical image data having a resolution lower than that of said reference lower hierarchical image data, with other reference higher hierarchical image data having a resolution lower than that of said reference lower hierarchical image data and which is different in phase than said reference higher hierarchical image data;

first motion vector detecting means for detecting a motion vector between said base image and said reference image, according to said base higher hierarchical image data and said multiplexed reference data; and second motion vector detecting means for detecting a motion vector between said base image and said reference image based on the motion vector obtained by said first motion vector detecting means, according to said base lower hierarchical image data and said reference lower hierarchical image data.

2. The motion vector detection device according to claim 1, further comprising:

means for generating base lower hierarchical activity data representing the activity of said base lower hierarchical image data, and base higher hierarchical activity data representing the activity of said base higher hierarchical image data; and means for generating reference lower hierarchical activity data representing the activity of said reference lower hierarchical image data, and multiplexed reference activity data representing the activity of said multiplexed reference data; wherein said first motion vector detecting means detects a motion vector between said base image and said reference image, according to said base higher hierarchical activity data and said multiplexed reference activity data, and said second motion vector detecting means detects a motion vector between said base image and said reference image, according to said base lower hierarchical activity data and said reference lower hierarchical activity data.

3. The motion vector detection device according to claim 1, wherein:

said means for outputting multiplexed reference data outputs data corresponding to positions that are oblique to said reference lower hierarchical image data.

4. The motion vector detection device according to claim 1, wherein:

said means for outputting multiplexed reference data outputs data corresponding to positions adjacent to a selected one of said reference lower hierarchical image data.

5. A method for detecting a motion vector between a base image and a reference image, comprising:

a process for outputting a base lower hierarchical image data having a resolution higher than that of said base image;

a process for outputting a base higher hierarchical image data having a resolution lower than that of said base lower hierarchical image data;

a process for outputting a reference lower hierarchical image data having a resolution higher than that of said reference image;

a process for outputting multiplexed reference data multiplexing a reference higher hierarchical image data having a resolution lower than that of said reference lower hierarchical image data, with other reference higher hierarchical image data having a resolution lower than that of said reference lower hierarchical image data and which is different in phase than said reference higher hierarchical image data;

a first process for detecting a motion vector between said base image and said reference image, according to said base higher hierarchical image data and said multiplexed reference data; and a second process for detecting a motion vector between said base image and said reference image based on the motion vector obtained by said first process for detecting a motion vector, according to said base lower hierarchical image data and said reference lower hierarchical image data.

6. The method for detecting a motion vector according to claim 5, further comprising:

a process for generating base lower hierarchical activity data representing the activity of said base lower hierarchical image data, and base higher hierarchical activity data representing the activity of said base higher hierarchical image data; and a process for generating reference lower hierarchical activity data representing the activity of said reference lower hierarchical image data, and multiplexed reference activity data representing the activity of said multiplexed reference data; wherein said first process for detecting a motion vector includes a process for detecting a motion vector between said base image and said reference image, according to said base higher hierarchical activity data and said multiplexed reference activity data, and said second process for detecting a motion vector includes a process for detecting a motion vector between said base image and said reference image, according to said base lower hierarchical activity data and said reference lower hierarchical activity data.

7. The method for detecting a motion vector according to claim 5, wherein:

said process for outputting multiplexed reference data is carried out by outputting data corresponding to positions that are oblique to said reference lower hierarchical image data.

8. The method for detecting a motion vector according to claim 5, wherein:

said process for outputting multiplexed reference data is carried out by outputting data corresponding to positions adjacent to a selected one of said reference lower hierarchical image data.

* * * * *